(12) United States Patent
Kuranuki

(10) Patent No.: US 11,894,702 B2
(45) Date of Patent: Feb. 6, 2024

(54) ENERGY TRANSFER CIRCUIT AND POWER STORAGE SYSTEM

(71) Applicant: Panasonic Intellectual Property Management Co., Ltd., Osaka (JP)

(72) Inventor: Masaaki Kuranuki, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 508 days.

(21) Appl. No.: 17/266,166

(22) PCT Filed: Aug. 1, 2019

(86) PCT No.: PCT/JP2019/030197
§ 371 (c)(1),
(2) Date: Feb. 5, 2021

(87) PCT Pub. No.: WO2020/049990
PCT Pub. Date: Mar. 12, 2020

(65) Prior Publication Data
US 2021/0313813 A1    Oct. 7, 2021

(30) Foreign Application Priority Data

Sep. 6, 2018  (JP) .............................. 2018-167045
Nov. 14, 2018 (JP) .............................. 2018-213507

(51) Int. Cl.
*H02J 7/00*    (2006.01)
*H01M 10/48*  (2006.01)

(52) U.S. Cl.
CPC .......... *H02J 7/0019* (2013.01); *H01M 10/48* (2013.01)

(58) Field of Classification Search
CPC ...... H02J 7/0019; H01M 10/48; H01M 10/44; Y02E 60/10; Y02T 10/70; B60L 58/22
(Continued)

(56) References Cited

U.S. PATENT DOCUMENTS 8,169,185 B2 *  5/2012  Partovi ................. H01F 27/366
                                                 320/108
8,692,508 B2 *  4/2014  Shimizu ................ H02J 7/0016
                                                 320/103
(Continued)

FOREIGN PATENT DOCUMENTS

CN    106849212 A  *  6/2017 ............ H02J 7/0014
DE  102008043611 A1 *  5/2010 ............ H02J 7/0019
(Continued)

OTHER PUBLICATIONS

T. Mizuno, T. Inoue, K. Iwasawa and H. Koizumi, "A voltage equalizer using flyback converter with active clamp," 2012 IEEE Asia Pacific Conference on Circuits and Systems, Kaohsiung, Taiwan, 2012, pp. 340-343, doi: 10.1109/APCCAS.2012.6419041. (Year: 2012).*

(Continued)

*Primary Examiner* — M Baye Diao
(74) *Attorney, Agent, or Firm* — Rimon P.C.

(57) ABSTRACT

The controller controls a cell selection circuit to electrically connect both ends of a cell to be discharged among n cells connected in series and both ends of the inductor for a predetermined time. Next, the controller controls the cell selection circuit to electrically cut off the n cells and the inductor, and turn on the clamp switch. Next, the controller turns off the clamp switch, and controls the cell selection circuit to electrically connect both ends of a cell to be charged among the n cells and both ends of the inductor for a predetermined time.

9 Claims, 15 Drawing Sheets

(58) Field of Classification Search
USPC .......................................................... 320/103
See application file for complete search history.

(56) References Cited

U.S. PATENT DOCUMENTS

| | | | | |
|---|---|---|---|---|
| 9,000,727 | B2* | 4/2015 | Castelaz | ................ H02J 7/345 |
| | | | | 320/118 |
| 9,472,961 | B2* | 10/2016 | De Cock | ............... H02J 7/0019 |
| 9,559,541 | B2* | 1/2017 | Cheng | ..................... H02M 1/36 |
| 10,256,511 | B2* | 4/2019 | Clemente | ............ H01M 50/213 |
| 11,437,828 | B2* | 9/2022 | Kuranuki | ......... G01R 19/16538 |
| 2005/0120715 | A1* | 6/2005 | Labrador | ................. F03G 7/00 |
| | | | | 60/618 |
| 2005/0150740 | A1* | 7/2005 | Finkenzeller | ........ B42D 25/485 |
| | | | | 194/207 |
| 2011/0248677 | A1* | 10/2011 | Shimizu | ................ H02J 7/0016 |
| | | | | 320/118 |
| 2013/0057198 | A1* | 3/2013 | Gerlovin | ............... H02J 7/0019 |
| | | | | 320/118 |
| 2018/0019606 | A1* | 1/2018 | Kang | .................... H02J 7/0019 |

FOREIGN PATENT DOCUMENTS

| | | | | |
|---|---|---|---|---|
| JP | 7-322516 | | 12/1995 | |
| JP | 2001076766 | A * | 3/2001 | ............ H02J 7/0018 |
| JP | 2016073066 | A * | 5/2016 | ............. B60L 58/22 |
| WO | WO-2009041180 | A1 * | 4/2009 | ............ H02J 7/0019 |
| WO | WO-2010051439 | A2 * | 5/2010 | ............ H02J 7/0019 |

OTHER PUBLICATIONS

International Search Report of PCT application No. PCT/JP2019/030197 dated Oct. 8, 2019.

* cited by examiner (a)

(b)

(c)

(a)

(b)

(c)

(a)  (b)

(a)　　　　　　　　　　(b)

(a)

(b)

(a)

(b)

(a)

(c)

(b)

(a)

(c)

(b)

(d)

ENERGY TRANSFER CIRCUIT AND POWER STORAGE SYSTEM

CROSS-REFERENCE TO RELATED APPLICATIONS

This application is a U.S. national stage application of the PCT International Application No. PCT/JP2019/030197 filed on Aug. 1, 2019, which claims the benefit of foreign priority of Japanese patent application No. 2018-167045 and 2018-213507 filed on Sep. 6, 2018 and Nov. 14, 2018, respectively, the contents all of which are incorporated herein by reference.

TECHNICAL FIELD

The present invention relates to an energy transfer circuit and a power storage system that transfers energy among a plurality of cells or modules connected in series.

BACKGROUND ART

In recent years, secondary batteries such as lithium-ion batteries and nickel-metal hydride batteries have been used for various applications. Secondary batteries are used, for example, for in-vehicle (including electric bicycles) applications aiming at supplying power to traveling motors of electric vehicles (EVs), hybrid electric vehicles (HEVs), and plug-in hybrid vehicles (PHVs), for power storage applications aiming at peak shift and backup, and for frequency regulation (FR) applications aiming at frequency stabilization of the system.

Generally, in a secondary battery such as a lithium-ion battery, from the viewpoint of maintaining power efficiency and ensuring safety, equalization processing is performed to equalize capacities among a plurality of cells connected in series. There are a passive method and an active method for equalization processing. The passive method is a method of equalizing capacities among a plurality of cells connected in series by connecting a discharge resistor to each of the plurality of cells, and discharging the other cells so as to match the voltages of the other cells with a voltage of a cell having the lowest voltage. The active method is a method of equalizing capacities among a plurality of cells connected in series by transferring energy among the plurality of cells. The active method has less power loss and can suppress an amount of heat generation, but at present, the passive method with a simple circuit configuration and low cost is the mainstream.

In recent years, the energy capacity and output of battery packs have been increasing, especially in in-vehicle applications. That is, the capacity of each cell in the battery pack and a number of cells in series are increasing. Along with this, the amount of energy that is imbalanced among a plurality of cells is increasing. Therefore, the equalization processing also increases the time required to eliminate the imbalance among the plurality of cells.

On the other hand, especially in in-vehicle applications, it is required to reduce the time required for equalization processing. In order to eliminate a large energy imbalance in a short time, it is necessary to apply a large current for equalization. In the passive method, since the energy imbalance is eliminated by consuming the capacity of the cell having a high voltage with the resistor, the amount of heat generation increases as the current flowing through the resistor increases. As described above, as the number of cells in series increases, it becomes difficult to secure a heat dissipation area for resistance heat generation on the substrate.

Therefore, there is an increasing need for an active method in which energy is transferred to a cell having a small capacity instead of being converted into heat and consumed. As a configuration of an active equalization circuit, there is a configuration in which an inductor is connected between the midpoint of two cells and the midpoint of two switches connected in parallel to the two cells (see, for example, PTL 1).

CITATION LIST

Patent Literature

PTL 1: Unexamined Japanese Patent Publication No. 7-322516

SUMMARY OF THE INVENTION

The above circuit configuration is a circuit for performing energy transfer between two adjacent cells, but when three or more cells are connected in series and configured so that energy can be transferred between any two cells, the circuit configuration becomes complicated. It is necessary to provide a cell selection circuit capable of arbitrarily selecting one of a plurality of cells, or to arrange a plurality of the above circuit configurations in series and transfer energy in a bucket relay manner. In the former case, the number of wirings and switches for forming the cell selection circuit increases. In the latter case, the number of inductors increases according to the number of cells in series.

The present invention has been made in view of such a situation, and an object of the present invention is to provide a technique for realizing an energy transfer circuit using an inductor with a small number of elements.

In order to solve the above problems, an energy transfer circuit of one embodiment of the present invention includes an inductor; a cell selection circuit provided between n cells, where n is an integer of two or more, connected in series and the inductor, and capable of conducting both ends of any cell of the n cells and both ends of the inductor; a clamp switch for forming a closed loop including the inductor in a state where the cell selection circuit does not select any cell; and a controller that controls the cell selection circuit and the clamp switch. The controller controls the cell selection circuit to conduct both ends of a cell to be discharged among the n cells and both ends of the inductor for a predetermined time, controls the cell selection circuit to electrically cut off the n cells and the inductor, and turn on the clamp switch, and turns off the clamp switch, and controls the cell selection circuit to conduct both ends of a cell to be charged among the n cells and both ends of the inductor for a predetermined time.

An energy transfer circuit according to an embodiment of the present invention includes an inductor; a cell selection circuit provided between n cells, where n is an integer of two or more, connected in series and the inductor, and capable of conducting both ends of any cell of the n cells and both ends of the inductor; four clamp switches that are fully bridge-connected for forming a closed loop including the inductor in a state where the cell selection circuit does not select any cell; and a controller that controls the cell selection circuit and the four clamp switches. The cell selection circuit includes a first wiring connected to one end of the inductor, a second wiring connected to the other end of the inductor, a plurality of first wiring side switches connected between odd-numbered nodes and the first wiring, respectively, among respective (n+1) nodes of the n cells connected in series, and at least one second wiring side switch connected between even-numbered nodes and the second wiring, respectively, among the respective (n+1) nodes of the n cells connected in series. Among the four clamp switches, a first arm having a first clamp switch and a second clamp switch connected in series and a second arm having a third clamp switch and a fourth clamp switch connected in series are connected in parallel between the first wiring and the second wiring, and the inductor is connected between a node between the first clamp switch and the second clamp switch and a node between the third clamp switch and the fourth clamp switch.

According to the present invention, it is possible to realize an energy transfer circuit that transfers energy among a plurality of cells or a plurality of modules by using an inductor with a small number of elements.

DESCRIPTION OF EMBODIMENTS

Figure 1:
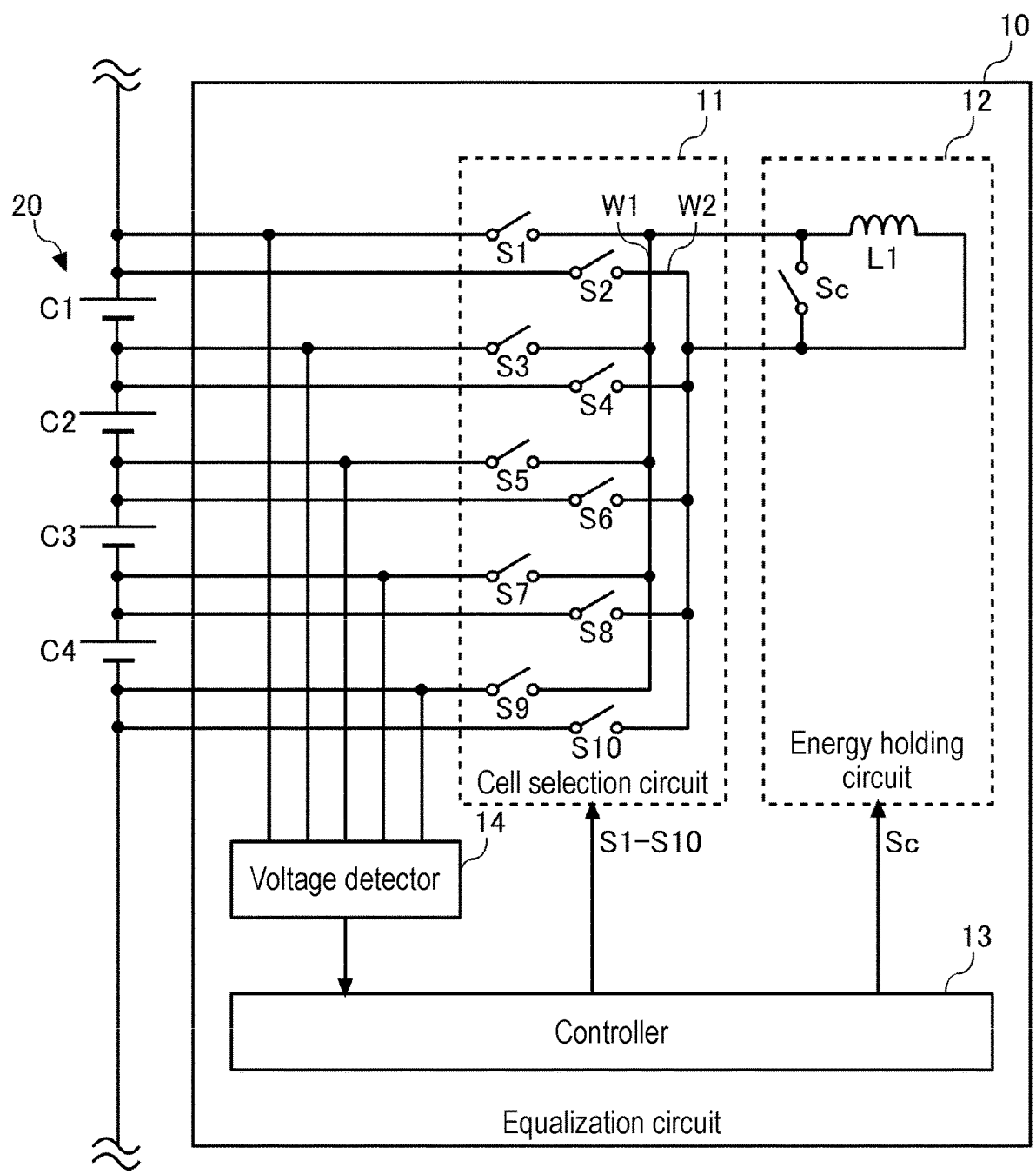
FIG. 1 is a diagram showing a configuration of a power storage system according to an exemplary embodiment of the present invention.

FIG. 1 is a diagram showing a configuration of power storage system 1 according to an exemplary embodiment of the present invention. Power storage system 1 includes equalization circuit 10 and power storage unit 20. Power storage unit 20 includes n (n is an integer of two or more) cells connected in series. FIG. 1 depicts an example in which four cells C1 to C4 are connected in series. A number of cells connected in series varies according to the voltage specifications required for power storage system 1.

For each cell, a chargeable and dischargeable power storage element such as a lithium ion battery cell, a nickel hydrogen battery cell, a lead battery cell, an electric double layer capacitor cell, and a lithium ion capacitor cell can be used. Hereinafter, in the present specification, an example using a lithium ion battery cell (nominal voltage: 3.6 V to 3.7 V) is assumed.

Equalization circuit 10 includes voltage detector 14, cell selection circuit 11, energy holding circuit 12, and controller 13. Voltage detector 14 detects each voltage of n (four in FIG. 1) cells connected in series. Specifically, voltage detector 14 is connected to respective nodes of n cells connected in series by (n+1) voltage lines, and detects a voltage between two adjacent voltage lines, thereby detecting a voltage of each cell. Voltage detector 14 can be configured, for example, by a general-purpose analog front-end integrated circuit (IC) or an application specific integrated circuit (ASIC). Voltage detector 14 converts the detected voltage of each cell into a digital value and outputs it to controller 13.

Cell selection circuit 11 is a circuit provided between the n cells connected in series and inductor L1 included in energy holding circuit 12, and capable of electrically connecting both ends of a cell selected from among the n cells to both ends of inductor L1. Cell selection circuit 11 includes first wire W1 connected to a first end of inductor L1, second wire W2 connected to a second end of inductor L1, (n+1) first wire side switches, and (n+1) second wire side switches. The (n+1) first wire side switches are connected between the respective nodes of the n cells connected in series and first wire W1, respectively. The (n+1) second wiring side switches are connected between the respective nodes of the n cells connected in series and second wire W2, respectively.

In the example shown in FIG. 1, n=4 and a number of nodes=5, and cell selection circuit 11 has five first wire side switches and five second wire side switches. In FIG. 1, first switch S1, third switch S3, fifth switch S5, seventh switch S7, and ninth switch S9 are the first wire side switches, and second switch S2, fourth switch S4, sixth switch. S6, eighth switch S8, and tenth switch S10 are the second wire side switches.

Energy holding circuit 12 includes inductor L1 and clamp switch Sc. Clamp switch Sc is a switch for electrically connecting both ends of inductor L1 in energy holding circuit 12. Energy holding circuit 12 can form a closed loop including inductor L1 in a state where cell selection circuit 11 does not select any cell. That is, when clamp switch Sc is controlled to be an on state, a closed loop including inductor L1 and clamp switch Sc is formed.

A semiconductor switch (for example, a metal-oxide-semiconductor field-effect transistor (MOSFET) or an insulated gate bipolar transistor (IGBT)) can be used for first switch S1 to tenth switch S10 and clamp switch Sc. Hereinafter, an example in which the MOSFET is used for first switch S1 to tenth switch S10 and clamp switch Sc is assumed.

Controller 13 executes equalization processing among the n cells connected in series based on the voltages of the n cells, the voltages being detected by voltage detector 14. Further, controller 13 determines voltage abnormality of a cell from the voltage value detected by voltage detector 14, and when it determines the voltage abnormality of the cell during the execution of equalization processing, controller 13 stops the execution of equalization processing and protects the cell from overvoltage or low voltage less than or equal to a predetermined value. Controller 13 can be configured by, for example, a microcomputer. Controller 13 and voltage detector 14 may be integrated into one chip.

In the exemplary embodiment, controller 13 executes equalization processing among n cells connected in series by the active cell balance method. In the active cell balance method according to the present exemplary embodiment, energy is transferred from one cell (cell to be discharged) to another cell (cell to be charged) among n cells connected in series to equalize capacities of one cell and the other cell. That is, equalization circuit 10 functions as an energy transfer circuit that transfers energy between any two cells, and by repeating this energy transfer, the capacities of n cells connected in series are equalized.

First, controller 13 controls cell selection circuit 11 to electrically connect both ends of a cell to be discharged among the n cells and both ends of inductor L1 for a predetermined time. In this state, a current flows from the cell to be discharged to inductor L1 and energy is accumulated in inductor L1.

Next, controller 13 controls cell selection circuit 11 to electrically cut off the n cells and inductor L1 and turn on clamp switch Sc. In this state, a circulating current flows through the closed loop, and the inductor current is actively clamped in energy holding circuit 12.

Next, controller 13 turns off clamp switch Sc and controls cell selection circuit 11 to electrically connect both ends of a cell to be charged among the n cells and both ends of inductor L1 for a predetermined time. In this state, the inductor current actively clamped in energy holding circuit 12 flows to the cell to be charged. As a result, the energy transfer from one cell to another is completed.

FIGS. 2(a) to 2(h) are diagrams for explaining an operation sequence example of the equalization processing of power storage system 1 according to the exemplary embodiment of the present invention. In the present operation sequence example, a number of cells in series is set to two for the sake of simplicity of explanation. In the first state shown in FIG. 2(a), controller 13 controls first switch S1 and fourth switch S4 to an on state, and controls second switch S2, third switch S3, fifth switch S5, sixth switch S6, and clamp switch Sc to an off state. In this state, a current flows from first cell C1 to inductor L1, and the energy discharged from first cell C1 is accumulated in inductor L1.

Figure 2:
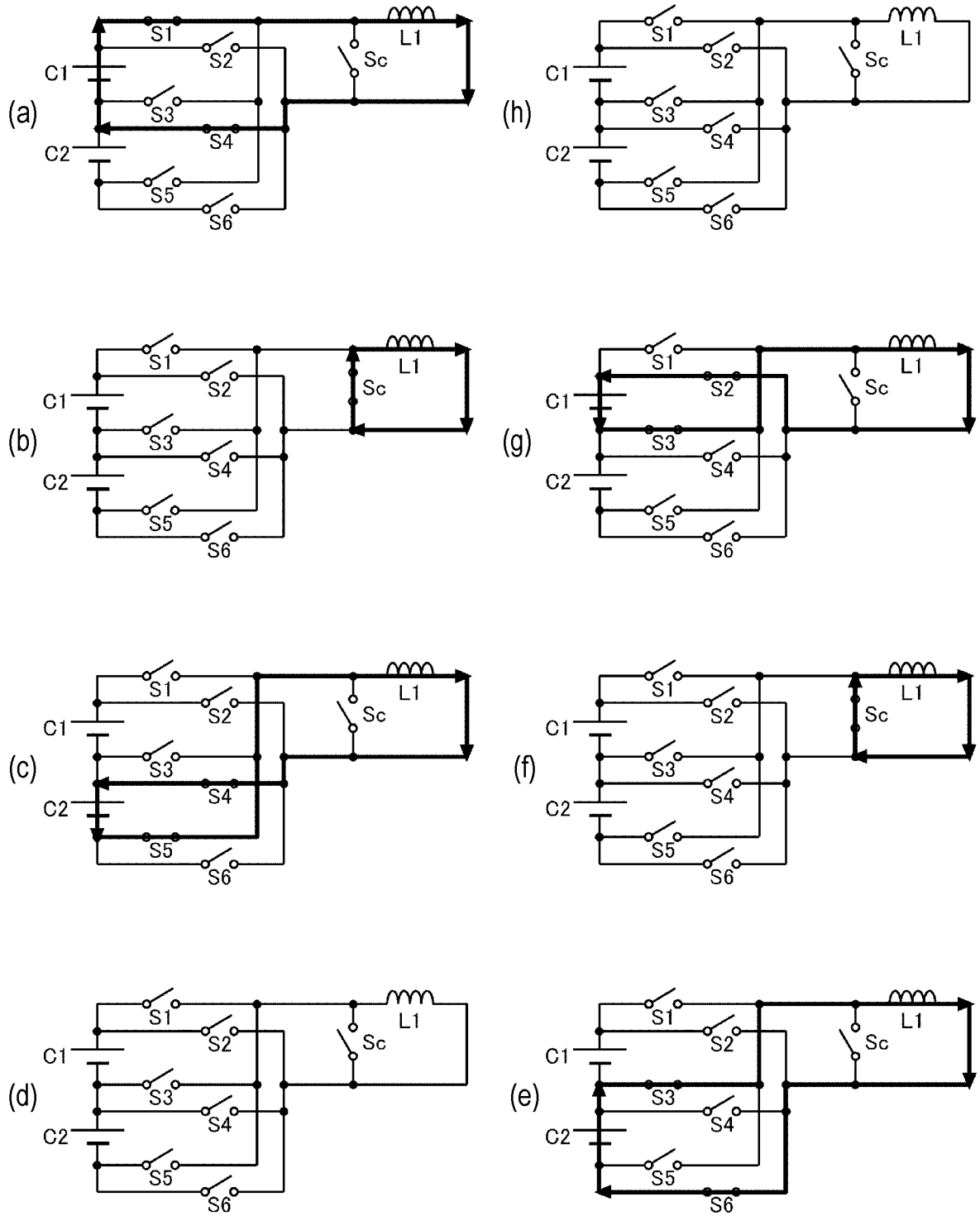
FIGS. 2(a) to 2(h) are diagrams for explaining an operation sequence example of equalization processing of the power storage system according to the exemplary embodiment of the present invention.

In the second state shown in FIG. 2(b), controller 13 controls clamp switch Sc to an on state, and controls first switch S1, second switch S2, third switch S3, fourth switch S4, fifth switch S5, and sixth switch S6 to an off state. In this state, the energy accumulated in inductor L1 flows in the closed loop as the inductor current and is actively clamped.

In the third state shown in FIG. 2(c), controller 13 controls fourth switch S4 and fifth switch S5 to an on state, and controls first switch S1, second switch S2, third switch S3, sixth switch S6, and clamp switch Sc to an off state. In this state, the inductor current actively clamped in the closed loop flows to second cell C2 to charge second cell C2.

In the fourth state shown in FIG. 2(d), controller 13 controls first switch S1, second switch S2, third switch S3, fourth switch S4, fifth switch S5, sixth switch S6, and clamp switch Sc to an off state. In this state, the energy transfer from first cell C1 to second cell C2 is completed.

In the fifth state shown in FIG. 2(e), controller 13 controls third switch S3 and sixth switch S6 to an on state, and controls first switch S1, second switch S2, fourth switch S4, fifth switch S5, and clamp switch Sc to an off state. In this state, a current flows from second cell C2 to inductor L1, and the energy discharged from first cell C1 is accumulated in inductor L1.

In the sixth state shown in FIG. 2(f), controller 13 controls clamp switch Sc to an on state, and controls first switch S1, second switch S2, third switch S3, fourth switch S4, fifth switch S5, and sixth switch S6 to an off state. In this state, the energy accumulated in inductor L1 flows in the closed loop as the inductor current and is actively clamped.

In the seventh state shown in FIG. 2(g), controller 13 controls second switch S2 and third switch S3 to an on state, and controls first switch S1, fourth switch S4, fifth switch S5, sixth switch S6, and clamp switch Sc to an off state. In this state, the inductor current actively clamped in the closed loop flows to first cell C1 to charge first cell C1.

In the eighth state shown in FIG. 2(h), controller 13 controls first switch S1, second switch S2, third switch S3, fourth switch S4, fifth switch S5, sixth switch S6, and clamp switch Sc to an off state. In this state, the energy transfer from second cell C2 to first cell C1 is completed.

In the second or sixth state, the inductor current is actively clamped in the closed loop to ensure the continuity of the inductor current, which enables safe and reliable switch switching of cell selection circuit 11.

Figure 3:
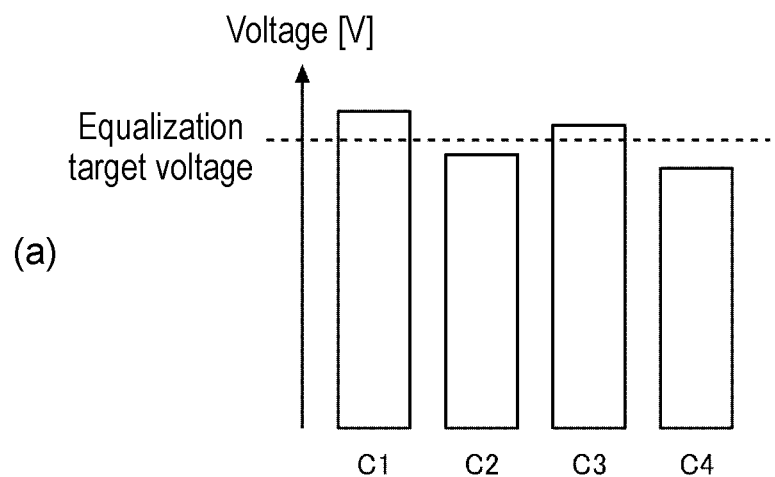
FIGS. 3(a) to 3(c) are diagrams for explaining a specific example of the equalization processing of the power storage system according to the exemplary embodiment of the present invention.
Figure 3:
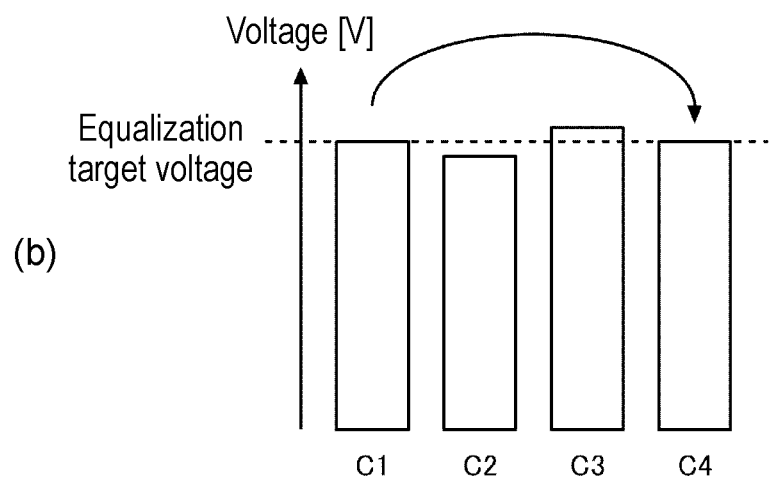
Figure 3:
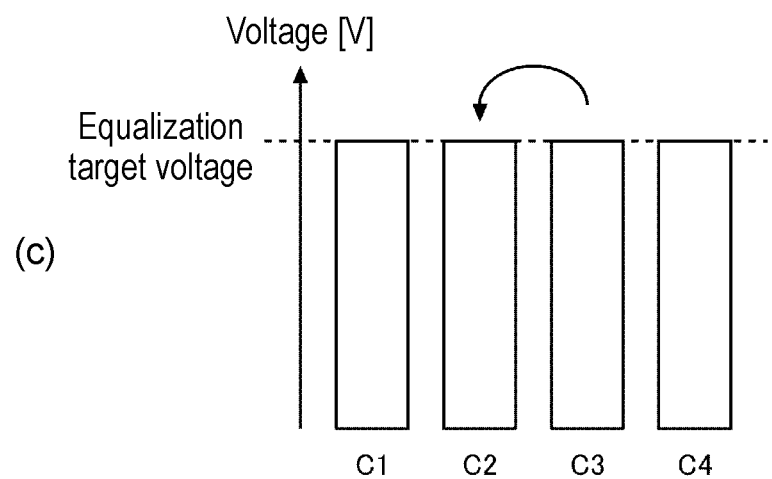

FIGS. 3(a) to 3(c) are diagrams for explaining a specific example of the equalization processing of power storage system 1 according to the exemplary embodiment of the present invention. In this specific example, an example in which four cells C1 to C4 are connected in series is assumed. FIG. 3(a) is a diagram schematically showing voltage states of first cell C1 to fourth cell C4 before start of the equalization processing. Controller 13 calculates the average value of the voltages of first cell C1 to fourth cell C4 detected by voltage detector 14, and sets the calculated average value as an equalization target voltage (hereinafter, simply referred to as a target voltage).

Controller 13 transfers energy from a cell having a voltage higher than the target voltage to a cell having a voltage lower than the target voltage. For example, energy is transferred from a cell having the highest voltage among the cells each having a voltage higher than the target voltage (first cell C1 in FIG. 3(a)) to a cell having the lowest voltage among the cells each having a voltage lower than the target voltage (fourth cell C4 in FIG. 3(a)).

Controller 13 determines an energy transfer amount within a range in which the voltage of a source cell (cell to be discharged) is equal to or higher than the target voltage and within a range in which the voltage of a destination cell (cell to be charged) is equal to or lower than the target voltage. Controller 13 determines a discharge time of the source cell and a charging time of the destination cell based on the determined energy transfer amount and the discharge current and charging current based on the design. Since the amount of energy consumed while being actively clamped to energy holding circuit 12 is negligible, the discharge time of the source cell and the charging time of the destination cell are almost the same.

FIG. 3(b) shows a state in which the energy transfer from first cell C1 which is the source cell to fourth cell C4 which is the destination cell is completed. Controller 13 executes the above-described processing again. Specifically, energy is transferred from the cell having the highest voltage among the cells each having a voltage higher than the target voltage (third cell C3 in FIG. 3(b)) to the cell having the lowest voltage among the cells each having a voltage lower than the target voltage (second cell C2 in FIG. 3(b)).

FIG. 3(c) shows a state in which the energy transfer from third cell C3 which is the source cell to second cell C2 which is the destination cell is completed. As described above, the equalization processing of first cell C1 to fourth cell C4 connected in series is completed.

In the specific example shown in FIGS. 3(a) to 3(c), first, the average value of the voltages of a plurality of cells connected in series is calculated, and the target value is set. In this regard, an algorithm that does not set a target value is also possible. At each time point, controller 13 equalizes the voltages of the two cells by transferring energy from a cell having the highest voltage to a cell having the lowest voltage among the voltages of the plurality of cells connected in series. Controller 13 repeatedly executes this processing until the voltages of the plurality of cells connected in series are all equalized.

Further, in the above specific example, although the example of using a voltage as the equalization target value has been described, an actual capacity, a dischargeable capacity or a rechargeable capacity may be used instead of the voltage.

FIGS. 4(a) to 4(c) are diagrams for explaining an equalization circuit according to a comparative example. As shown in FIG. 4(a), the equalization circuit according to the comparative example includes two cells C1, C2 connected in series, inductor L1, and two switches S51, S52. A first end of inductor L1 is connected to a midpoint of two cells C1, C2, and a second end of inductor L1 is connected to a midpoint of two switches S51, S52 (a node at which the first ends of two switches S51, S52 are connected to each other).

The operation sequence when energy is transferred from first cell C1 to second cell C2 will be described below. First, as shown in FIG. 4(b), switch S51 is controlled to an on state, and switch S52 is controlled to an off state. As a result, a current flows from first cell C1 to inductor L1, and the energy discharged from first cell C1 is accumulated in inductor L1. Next, as shown in FIG. 4(c), switch S51 is controlled to an off state, and switch S52 is controlled to an on state. As a result, a current flows from inductor L1 to second cell C2 to charge second cell C2. In this way, energy transfer between two cells C1, C2 connected in series can be achieved by inductor L1 and two switches S51, S52.

FIGS. 5(a) and 5(b) are diagrams for explaining a circuit configuration example in which the equalization circuit shown in FIG. 4(a) is extended when three or more cells connected in series are used. FIGS. 5(a) and 5(b) show a circuit configuration example when four cells C1 to C4 are used. When three or more cells connected in series are used, three wirings W1 to W3 are required for connecting respective nodes of the plurality of cells to the second end of switch S51, the first end of inductor L1, and the second end of switch S52, respectively. Of three wirings W1 to W3, potential of first wiring W1 connected to the second end of switch S51 is the highest, and potential of second wiring W2 connected to the first end of inductor L1 is the next highest, and potential of third wiring W3 connected to the second end of switch S52 is the lowest.

As shown in FIG. 5(a), three switches are connected between each node of a plurality of cells and three wirings W1 to W3. When a cell is discharged, the switch connected between the upper node of the cell and first wiring W1 and the switch connected between the lower node of the cell and second wiring W2 are turned on. As a result, a discharge path from the cell to inductor L1 is formed.

When a cell is charged, the switch connected between the upper node of the cell and second wiring W2 and the switch connected between the lower node of the cell and third wiring W3 are turned on. As a result, a charging path from inductor L1 to the cell is formed.

In the circuit configuration shown in FIG. 5(a), since another cell is not connected to an upper node of first cell C1, a path used for charging and discharging the other cell is unnecessary. Therefore, switch S54 connected between the node and second wiring W2 and switch S53 connected between the node and third wiring W3 can be omitted.

Further, since another cell is not connected to a lower node of fourth cell C4, a path used for charging and discharging the another cell is unnecessary. Therefore, switch S67 connected between the node and first wiring W1 and switch S66 connected between the node and second wiring W2 can be omitted.

Furthermore, switch S56 can be omitted by reversing the discharge path and the charging path when charging first cell C1, and switch S64 can be omitted by reversing the discharge path and the charging path when discharging fourth cell C4. From the above, a total of six switches can be omitted. FIG. 5(b) shows a circuit configuration in which six switches S53, S54, S56, S64, S66, and S67 are removed from the circuit configuration of FIG. 5(a).

FIGS. 6(a) and 6(b) are diagrams for explaining an operation sequence when energy is transferred from first cell C1 to third cell C3 in the equalization circuit shown in FIG. 5(b). In the first state shown in FIG. 6(a), switches S55, S57, and S51 are controlled to an on state, and other switches S58, S59, S60, S61, S62, S63, S65, and S52 are controlled to an off state. In this state, a current flows from first cell C1 to inductor L1, and the energy discharged from first cell C1 is accumulated in inductor L1.

In the second state shown in FIG. 6(b), switches S60, S62, and S52 are controlled to an on state, and other switches S55, S57, S58, S59, S61, S63, S65, and S51 are controlled to an off state. In this state, a current flows from inductor L1 to third cell C3 to charge third cell C3.

Hereinafter, the equalization circuit according to the exemplary embodiment of the present invention described above and the equalization circuit according to the comparative example will be compared. In the exemplary embodiment of the present invention, as shown in FIGS. 2(a) to 2(h), an active clamp period is provided to actively clamp the inductor current between a discharge period of discharging from the source cell and a charging period of charging the destination cell. During this active clamp period, all the switches included in cell selection circuit 11 are controlled to an off state, and inductor L1 and the plurality of cells C1 to C4 connected in series are separated.

Figure 6:
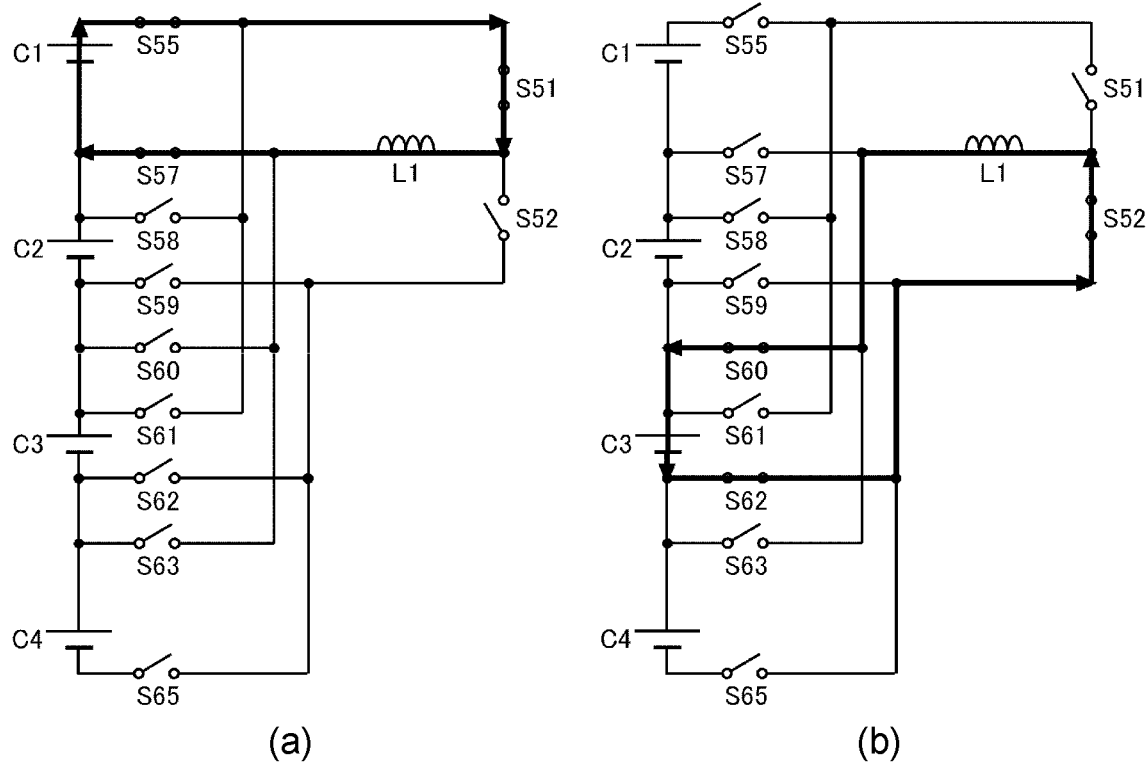
FIGS. 6(a) and 6(b) are diagrams for explaining an operation sequence when energy is transferred from a first cell to a third cell in the equalization circuit shown in FIG. 5(b).

On the other hand, as shown in FIGS. 6(*a*) and 6(*b*) in the comparative example, the active clamp period is not provided between the discharge period and the charging period. Therefore, when switching is made from the discharge period to the charging period, the energy ($LI^2/2$ (L is the inductance of L1 and I is the current of L1)) accumulated in inductor L1 has nowhere to go, generates a counter electromotive voltage, and may cause dielectric breakdown of the switch. If the dielectric breakdown occurs in the switch, the cell will be short-circuited and the cell will be damaged.

On the other hand, in the present exemplary embodiment, by providing an active clamp period in which all the switches included in cell selection circuit 11 are controlled to an off state, it is possible to prevent the switch from causing dielectric breakdown when switching is made from the discharge period to the charging period and to prevent the cell from being short-circuited.

Figure 4:
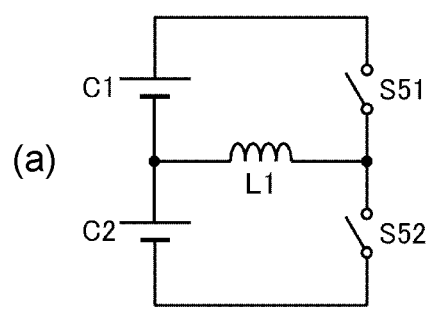
FIGS. 4(a) to 4(c) are diagrams for explaining an equalization circuit according to a comparative example.
Figure 4:
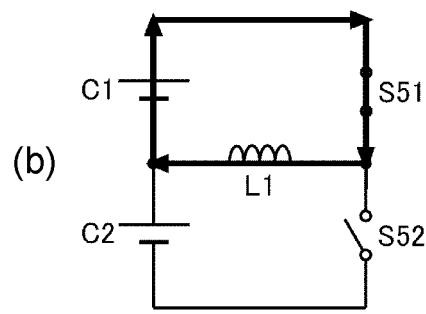
Figure 4:
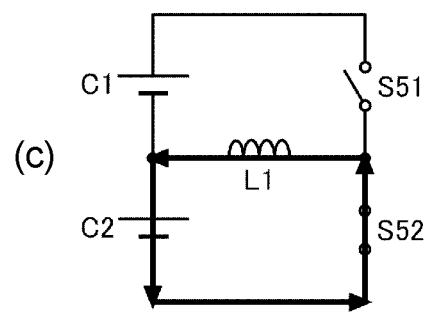

Also in the comparative example, in the configuration in which two cells C1, C2 are connected in series as shown in FIGS. 4(*a*) to 4(*c*), by using a reverse conducting diode (parasitic diode) formed between the source and drain of the metal oxide silicon field effect transistor (MOSFET) used as a switch, it is possible to prevent the switch from causing dielectric breakdown. For example, when switch S51 is turned off from the state shown in FIG. 4(*b*), the reverse conducting diode of switch S52 is electrically connected, and switch S52 is turned on in a state where a small amount of current flows through the reverse conducting diode. As a result, it is possible to prevent switches S51, S52 from causing dielectric breakdown.

Note that, in the comparative example, in a configuration in which three or more cells are connected in series, it is difficult to electrically connect only the reverse conducting diode of the switch included in the charging path of the cell to be charged, so it is difficult to adopt a method to prevent dielectric breakdown by using the reverse conducting diode.

Figure 5:
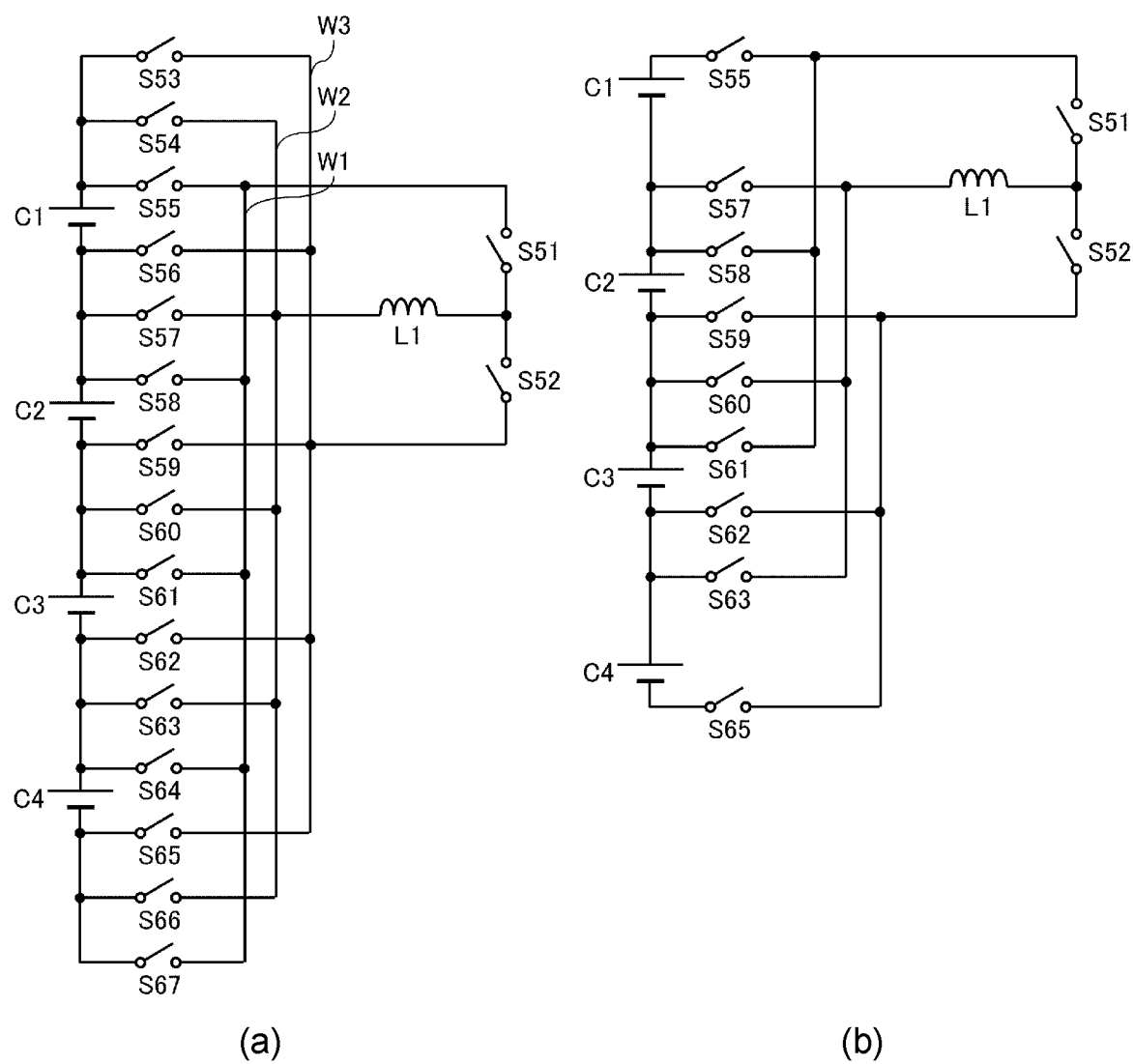
FIGS. 5(a) and 5(b) are diagrams for explaining a circuit configuration example in which the equalization circuit shown in FIG. 4(a) is extended when three or more cells connected in series are used.
Figure 7:
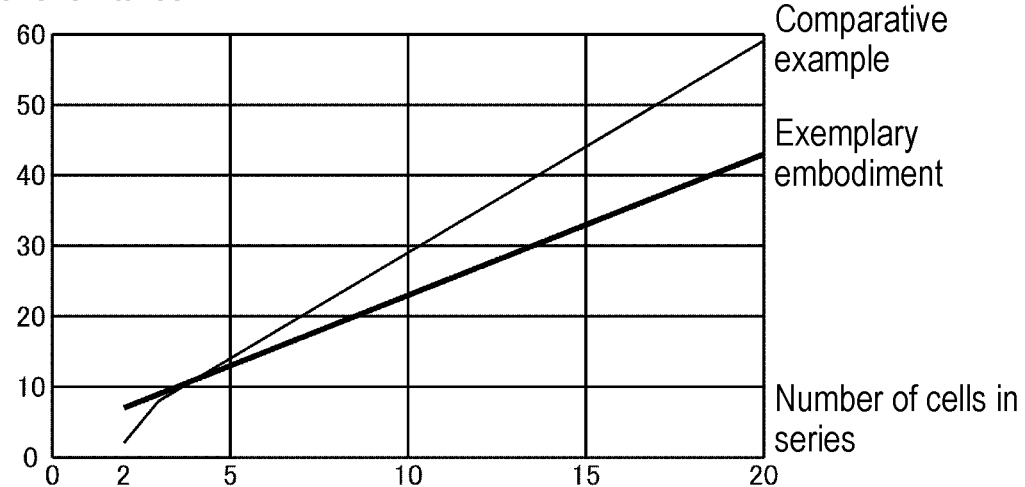
FIG. 7 is a graph showing a number of switches used in the equalization circuit according to the exemplary embodiment of the present invention and the equalization circuit according to the comparative example.

FIG. 7 is a graph showing a number of switches used in the equalization circuit according to the exemplary embodiment of the present invention and the equalization circuit according to the comparative example. The horizontal axis shows the number of cells in series, and the vertical axis shows the number of switches. In the comparative example, when the number of cells in series is two, the number of switches is two as shown in FIGS. 4(*a*) to 4(*c*). When the number of cells in series is three or more, the number of switches is defined by $3(n+1)-6+2$ as shown in FIG. 5(*b*). $-6$ is the number of switches S53, S54, S56, S64, S66, and S67 that can be reduced due to circuit peculiarities, and $+2$ is the number of switches S51, S52 connected to the second end of inductor L1. In the exemplary embodiment, the number of switches is defined as $2(n+1)+1$ as shown in FIG. 1. $+1$ is a number of clamp switches Sc.

Comparing the comparative example and the exemplary embodiment, when the number of cells in series is three or less, the number of switches in the comparative example is smaller, when the number of cells in series is four, the numbers of switches of both are equal, and when the number of cells in series is five or more, the number of switches in the exemplary embodiment is smaller. For example, when the number of cells in series is 16, 45 switches are required in the comparative example, but 34 switches are sufficient in the exemplary embodiment. As described above, in the exemplary embodiment, as the number of cells in series increases, the effect of reducing the number of switches increases.

As described above, according to the present exemplary embodiment, an active equalization circuit using an inductor can be achieved with a small number of elements. In recent years, the number of cells in series tends to increase, especially in in-vehicle applications. Therefore, the effect of reducing the number of switches by adopting the equalization circuit according to the present exemplary embodiment tends to increase. Further, since it is not necessary to change the constant of inductor L1 between the present exemplary embodiment and the comparative example, it is also not necessary to increase the size of inductor L1 or the size of the switch by adopting the present exemplary embodiment.

Further, in the present exemplary embodiment, an active clamp period for actively clamping the inductor current is provided between the discharge period for discharging one cell and the charging period for charging another cell. By simultaneously turning off the switch on the discharge path and the switch on the charging path during this active clamp period, it is possible to switch the switch in cell selection circuit 11 safely and smoothly.

In this regard, in the comparative example, when a selection switch is provided in response to an increase in the number of cells in series, if the switch on the discharge path and the switch on the charging path are turned off at the same time, a large counter electromotive voltage is generated, which may lead to dielectric breakdown of the switch. In order to control the switch on the discharge path and the switch on the charging path so as not to be turned off at the same time, it is necessary to perform switch control at a strict timing, which increases the cost of the switch control circuit.

Further, in the present exemplary embodiment, since the continuity of the inductor current is ensured before and after the active clamp period, energy transfer can be performed with almost no decrease in efficiency even if the active clamp period is provided.

The present invention has been described above based on the exemplary embodiment. It will be understood by those skilled in the art that the exemplary embodiment is merely an example, various modified examples are available in each component thereof or in a combination of each processing process, and such modified examples still fall within the scope of the present invention.

Figure 8:
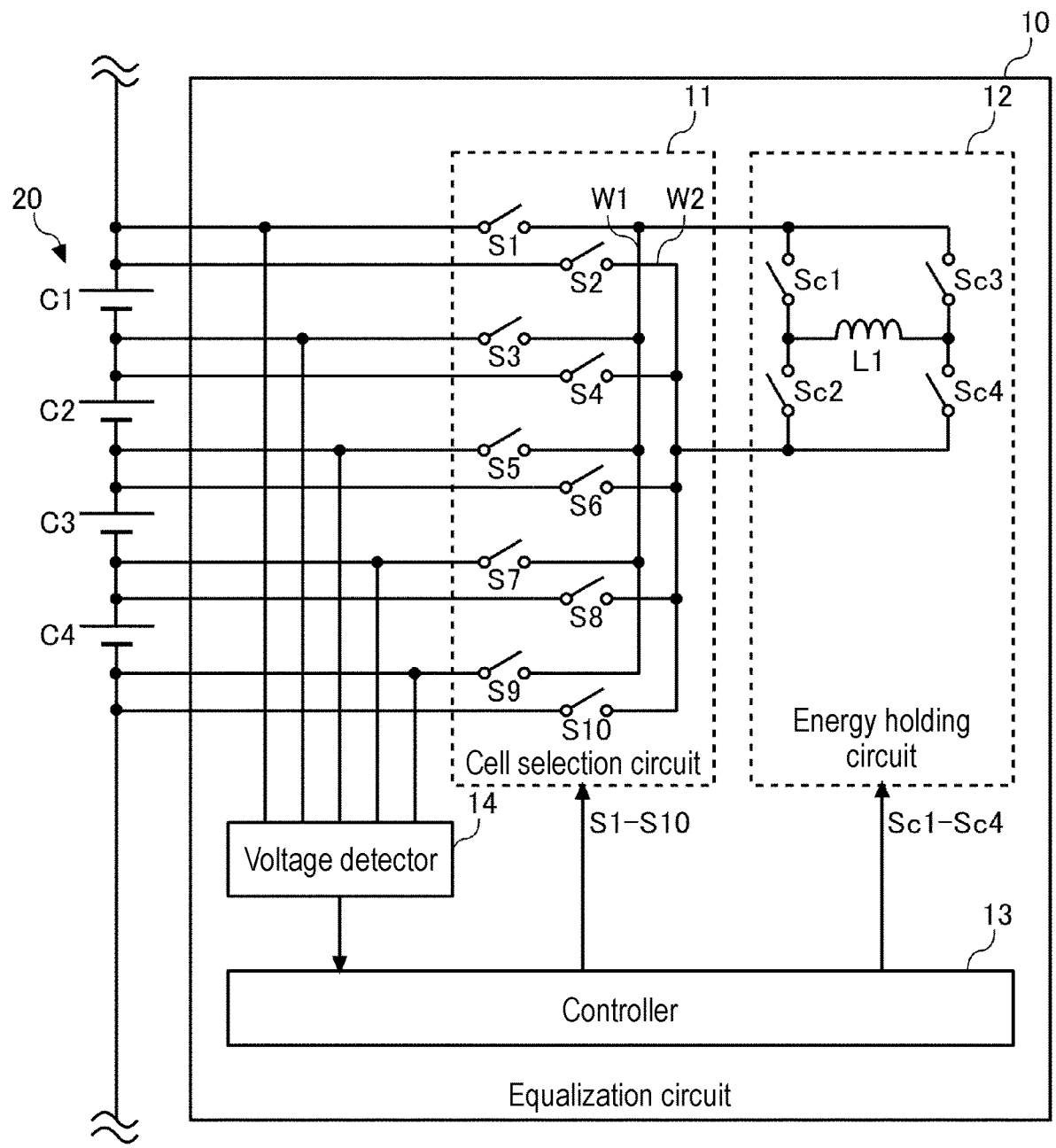
FIG. 8 is a diagram showing a configuration of a power storage system according to a modified example of the present invention.

FIG. 8 is a diagram showing a configuration of power storage system 1 according to a modified example of the present invention. In power storage system 1 shown in FIG. 8, the components common to or corresponding to power storage system 1 shown in FIG. 1 are numbered the same. In the modified example, the clamp switch in energy holding circuit 12 has a full bridge configuration. In energy holding circuit 12 according to the modified example, first clamp switch Sc1 and second clamp switch Sc2 are connected in series between first wiring W1 and second wiring W2. Further, between first wiring W1 and second wiring W2, third clamp switch Sc3 and fourth clamp switch Sc4 are connected in series in parallel with first clamp switch Sc1 and second clamp switch Sc2. The first end of inductor L1 is connected to the midpoint of first clamp switch Sc1 and second clamp switch Sc2, and the second end of inductor L1 is connected to the midpoint of third clamp switch Sc3 and fourth clamp switch Sc4.

In the configuration according to the modified example, the direction of the discharge current or the charging current can be arbitrarily selected. Even in the configuration shown in FIG. 1, if first switch S1 to tenth switch S10 are configured by bidirectional switches, the direction of the discharge current or the charging current can be arbitrarily selected.

In the above-described exemplary embodiment, an example of equalizing a plurality of cells connected in series by an active method has been described. In this regard, the equalization circuit according to the exemplary embodiment can be used to equalize a plurality of modules connected in series. The "cell" in the present specification may be appropriately read as a "module". Further, the equalization processing among a plurality of modules connected in series and the equalization processing among a plurality of cells connected in series in each module may be executed in a multiplexed manner.

Figure 9:
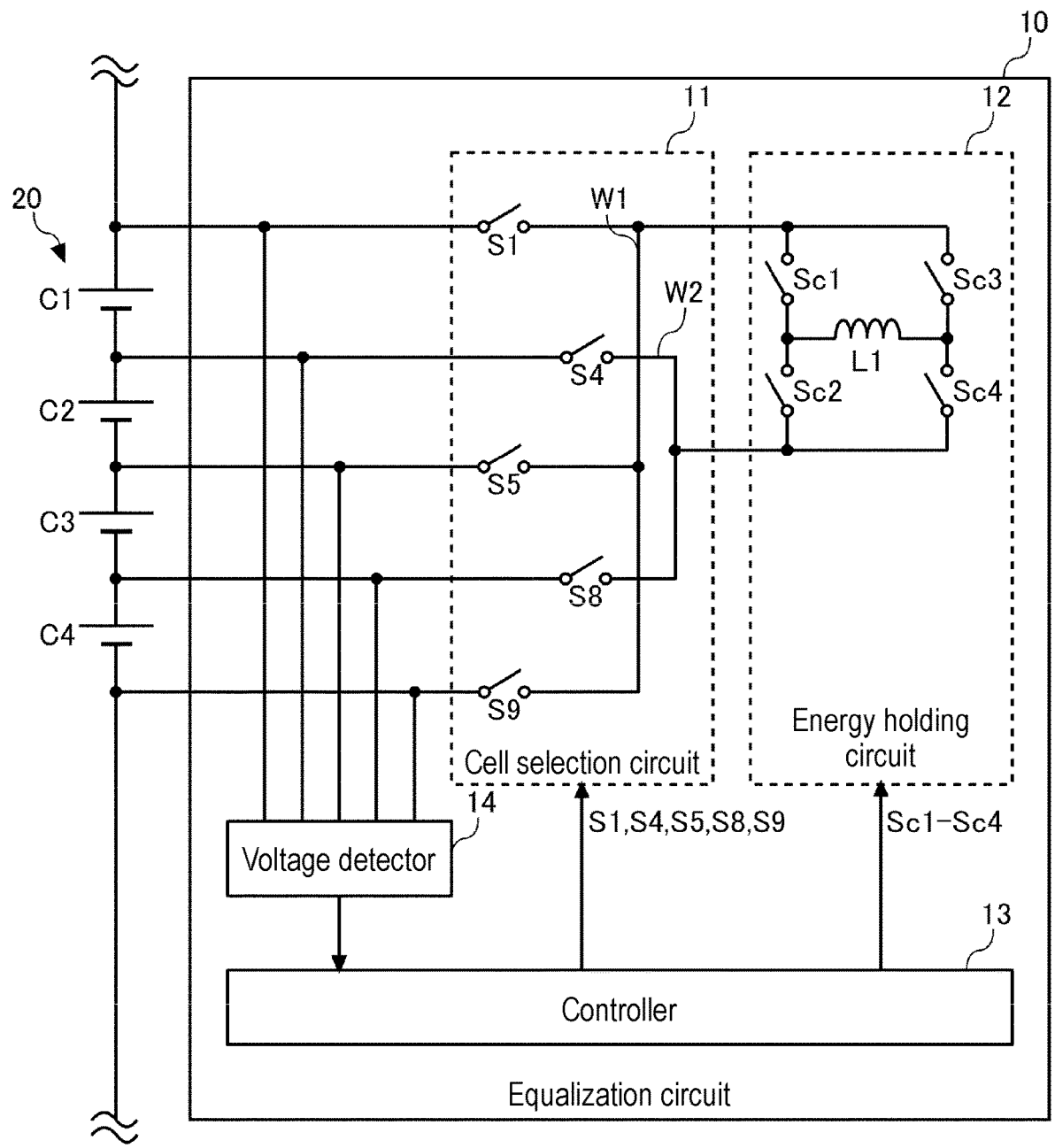
FIG. 9 is a diagram showing a configuration of a power storage system according to another exemplary embodiment of the present invention.

FIG. 9 is a diagram showing the configuration of power storage system 1 according to another exemplary embodiment of the present invention. In power storage system 1 shown in FIG. 9, the components common to or corresponding to power storage system 1 shown in FIGS. 1 and 8 are numbered the same.

Cell selection circuit 11 includes first wiring W1 connected to the first end of inductor L1, second wiring W2 connected to the second end of inductor L1, a plurality of first wiring side switches, and at least one second wiring side switch.

The plurality of first wiring side switches are connected between the odd-numbered nodes and first wiring W1 among the (n+1) nodes of the n cells connected in series. At least one second wiring side switch is connected between the even-numbered node and second wiring W2 among the (n+1) nodes of the n cells connected in series.

In the example shown in FIG. 9, n=4 and a number of nodes=5, and cell selection circuit 11 has three first wiring side switches and two second wiring side switches. In FIG. 9, first switch S1, fifth switch S5, and ninth switch S9 are the first wiring side switches, and fourth switch S4 and eighth switch S8 are the second wiling side switches.

Energy holding circuit 12 includes inductor L1, first clamp switch Sc1, second clamp switch Sc2, third clamp switch Sc3, and fourth clamp switch Sc4. First clamp switch Sc1, second clamp switch Sc2, third clamp switch Sc3, and fourth clamp switch Sc4 form a full bridge circuit. Specifically, the first arm in which first clamp switch Sc1 and second clamp switch Sc2 are connected in series, and the second arm in which third clamp switch Sc3 and fourth clamp switch Sc4 are connected in series are connected in parallel between first wiring W1 and second wiring W2. Inductor L1 is connected between a node between first clamp switch Sc1 and second clamp switch Sc2 and a node between third clamp switch Sc3 and fourth clamp switch Sc4.

First clamp switch Sc1 to fourth clamp switch Sc4 can electrically connect both ends of inductor L1 in energy holding circuit 12. Specifically, in a state where cell selection circuit 11 does not select any cell, first clamp switch Sc1 and third clamp switch Sc3 are controlled to an on state, and second clamp switch Sc2 and fourth clamp switch Sc4 are controlled to an off state, or first clamp switch Sc1 and third clamp switch Sc3 are controlled to an off state, and second clamp switch Sc2 and fourth clamp switch Sc4 are controlled to an on state, and thereby a closed loop including inductor L1 can be formed in energy holding circuit 12.

Further, first clamp switch Sc1 to fourth clamp switch Sc4 can switch the direction of the current flowing through inductor L1. Specifically, in a state where cell selection circuit 11 selects any cell, first clamp switch Sc1 and fourth clamp switch Sc4 are controlled to an on state, and second clamp switch Sc2 and third clamp switch Sc3 are controlled to an off state, or first clamp switch Sc1 and fourth clamp switch Sc4 are controlled to an off state, and second clamp switch Sc2 and third clamp switch Sc3 are controlled to an on state, and thereby the direction of the current flowing through inductor L1 can be switched.

Controller 13 executes equalization processing among the n cells connected in series based on the voltages of the n cells, the voltages being detected by voltage detector 14. Further, controller 13 determines voltage abnormality of a cell from the voltage value detected by voltage detector 14, and when it determines the voltage abnormality of the cell during the execution of equalization processing, controller 13 stops the execution of equalization processing and protects the cell from overvoltage or low voltage less than or equal to a predetermined value. Controller 13 can be configured by, for example, a microcomputer. Controller 13 and voltage detector 14 may be integrated into one chip.

In the exemplary embodiment, controller 13 executes equalization processing among n cells connected in series by the active cell balance method. In the active cell balance method according to the present exemplary embodiment, energy is transferred from one cell (cell to be discharged) to another cell (cell to be charged) among n cells connected in series to equalize capacities of one cell and the other cell. By repeating this energy transfer, the capacities of the n cells connected in series are equalized.

First, controller 13 controls first clamp switch Sc1 and fourth clamp switch Sc4 to an on state and second clamp switch Sc2 and third clamp switch Sc3 to an off state, or controls first clamp switch Sc1 and fourth clamp switch Sc4 to an off state and controls second clamp switch Sc2 and third clamp switch Sc3 to an on state, and controls cell selection circuit 11 to electrically connect both ends of a cell to be discharged among the n cells and both ends of inductor L1 for a predetermined time. In this state, a current flows from the cell to be discharged to inductor L1 and energy is accumulated in inductor L1.

Next, controller 13 controls cell selection circuit 11 to electrically shut off n cells and inductor L1, and controls first clamp switch Sc1 and third clamp switch Sc3 to an on state, and second clamp switch Sc2 and fourth clamp switch Sc4 to an off state, or controls first clamp switch Sc1 and third clamp switch Sc3 to an off state, and second clamp switch Sc2 and fourth clamp switch Sc4 to an on state. In this state, a circulating current flows through the closed loop, and the inductor current is actively clamped in energy holding circuit 12.

Next, controller 13 controls first clamp switch Sc1 and fourth clamp switch Sc4 to an on state, and second clamp switch Sc2 and third clamp switch Sc3 to an off state, or controls first clamp switch Sc1 and fourth clamp switch Sc4 to an off state, and second clamp switch Sc2 and third clamp switch Sc3 to an on state, and controls cell selection circuit 11 to electrically control both ends of a cell to be charged among the n cells and both ends of inductor L1 for a predetermined time. In this state, the inductor current actively clamped in energy holding circuit 12 flows to the cell to be charged. As a result, the energy transfer from one cell to another is completed.

FIGS. 10(a) to 10(h) are circuit diagrams for explaining a basic operation sequence example of the equalization processing of power storage system 1 according to the exemplary embodiment shown in FIG. 9. In the present basic operation sequence example, the number of cells in series is set to two for the sake of simplicity of explanation. In the first state shown in FIG. 10(a), controller 13 controls first switch S1, first clamp switch Sc1, fourth clamp switch Sc4, and fourth switch S4 to an on state, and controls fifth switch S5, second clamp switch Sc2, and third clamp switch Sc3 to an off state. In this state, a current flows from first cell C1 to inductor L1, and the energy discharged from first cell C1 is accumulated in inductor L1.

Figure 10:
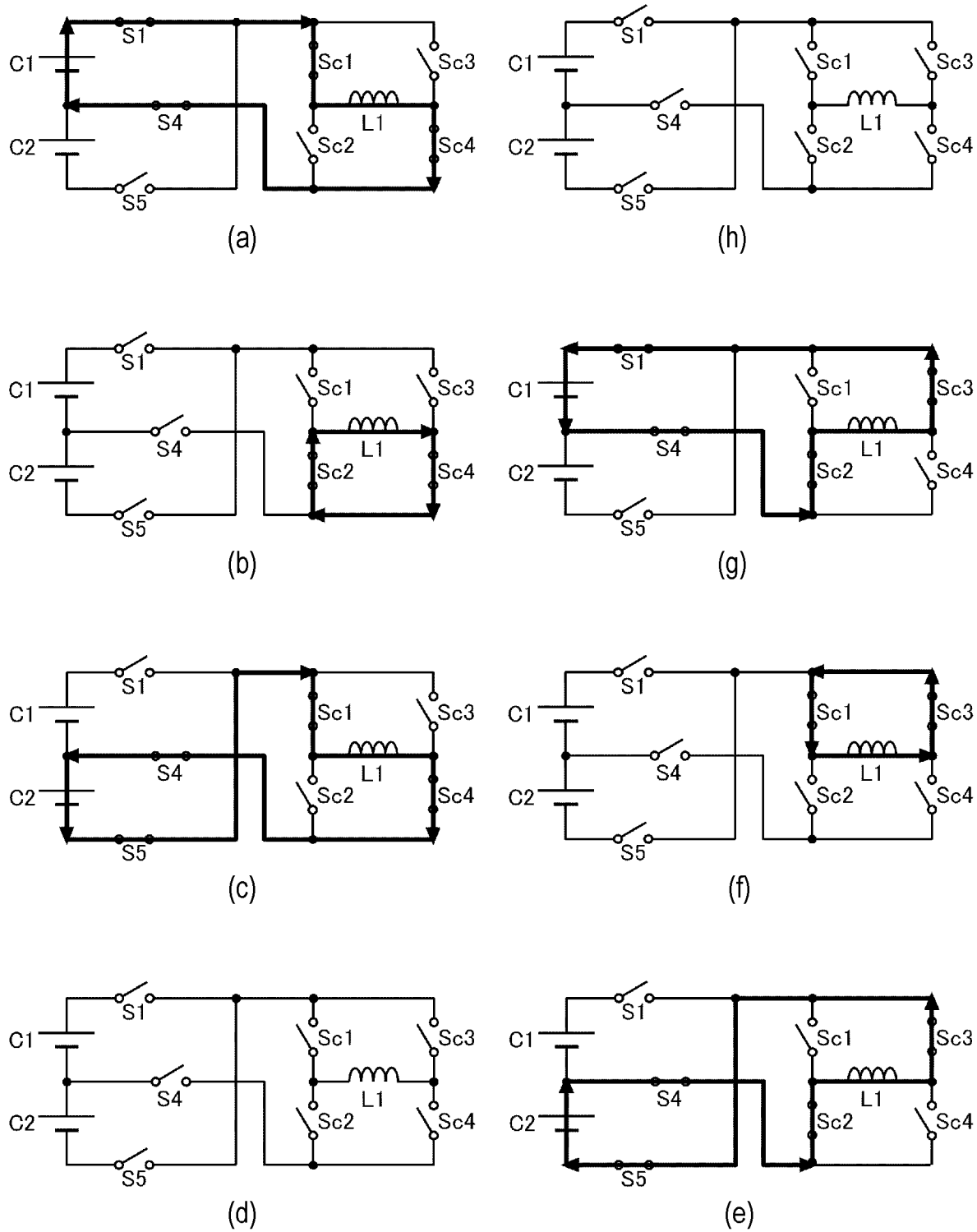
FIGS. 10(a) to 10(h) are circuit diagrams for explaining a basic operation sequence example of the equalization processing of the power storage system according to the exemplary embodiment of the present invention.

In the second state shown in FIG. 10(b), controller 13 controls second clamp switch Sc2 and fourth clamp switch Sc4 to an on state, and controls first switch S1, fourth switch S4, fifth switch S5, first clamp switch Sc1, and third clamp switch Sc3 to an off state. In this state, the energy accumulated in inductor L1 flows in the closed loop as the inductor current and is actively clamped.

In the third state shown in FIG. 10(c), controller 13 controls fourth clamp switch Sc4, fourth switch S4, fifth switch S5, and first clamp switch Sc1 to an on state, and controls first switch S1, second clamp switch Sc2, and third clamp switch Sc3 to an off state. In this state, the inductor current actively clamped in the closed loop flows to second cell C2 to charge second cell C2.

In the fourth state shown in FIG. 10(d), controller 13 controls first switch S1, fourth switch S4, fifth switch S5, and first clamp switch Sc1 to fourth clamp switch Sc4 to an off state. In this state, the energy transfer from first cell C1 to second cell C2 is completed.

In the fifth state shown in FIG. 10(e), controller 13 controls fourth switch S4, second clamp switch Sc2, third clamp switch Sc3, and fifth switch S5 to an on state, and controls first switch S1, first clamp switch Sc1, and fourth clamp switch Sc4 to an off state. In this state, a current flows from second cell C2 to inductor L1, and the energy discharged from second cell C2 is accumulated in inductor L1.

In the sixth state shown in FIG. 10(f), controller 13 controls first clamp switch Sc1 and third clamp switch Sc3 to an on state, and controls first switch S1, fourth switch S4, fifth switch S5, second clamp switch Sc2, and third clamp switch Sc3 to an off state. In this state, the energy accumulated in inductor L1 flows in the closed loop as the inductor current and is actively clamped.

In the seventh state shown in FIG. 10(g), controller 13 controls third clamp switch Sc3, first switch S1, fourth switch S4, and second clamp switch Sc2 to an on state, and controls fifth switch S5, first clamp switch Sc1, and fourth clamp switch Sc4 to an off state. In this state, the inductor current actively clamped in the closed loop flows to first cell C1 to charge first cell C1.

In the eighth state shown in FIG. 10(h), controller 13 controls first switch S1, fourth switch S4, fifth switch S5, and first clamp switch Sc1 to fourth clamp switch Sc4 to an off state. In this state, the energy transfer from second cell C2 to first cell C1 is completed.

In the second or sixth state, the inductor current is actively clamped in the closed loop to ensure the continuity of the inductor current, which enables safe and reliable switch switching of cell selection circuit 11.

Controller 13 determines an energy transfer amount within a range in which the voltage of a source cell (cell to be discharged) is equal to or higher than the target voltage and within a range in which the voltage of a destination cell (cell to be charged) is equal to or lower than the target voltage. Controller 13 determines a discharge time of the source cell and a charging time of the destination cell based on the determined energy transfer amount and the discharge current and charging current based on the design. Since the amount of energy consumed while being actively clamped to energy holding circuit 12 is negligible, the discharge time of the source cell and the charging time of the destination cell are almost the same.

It is advantageous to use a MOSFET with relatively high switching speed and relatively low cost for a plurality of switches included in cell selection circuit 11 and four clamp switches included in energy holding circuit 12. In an N-channel MOSFET, a parasitic diode (body diode) is formed in a direction from the source to the drain. Therefore, in applications where a current may flow in from both the source terminal and the drain terminal, it is common to connect two MOSFETs in series in opposite directions and use them as a bidirectional switch.

Figure 11:
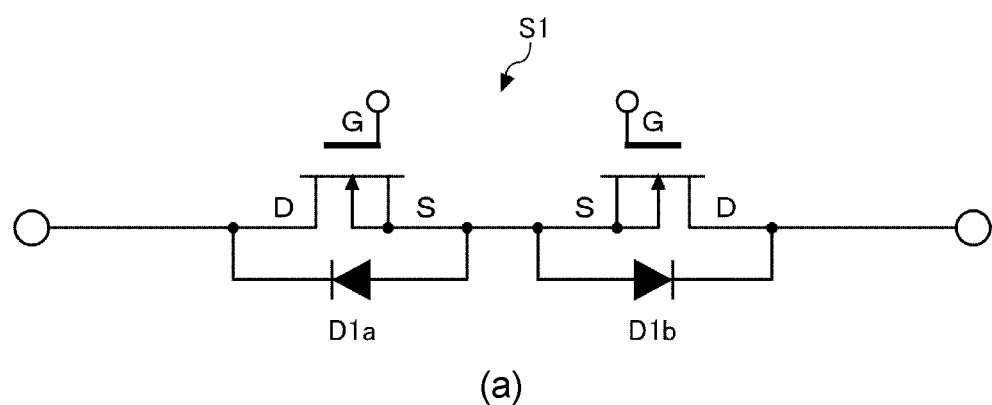
FIGS. 11(a) to 11(b) are diagrams showing a circuit configuration example when a first switch includes two N-channel MOSFETs.
Figure 11:
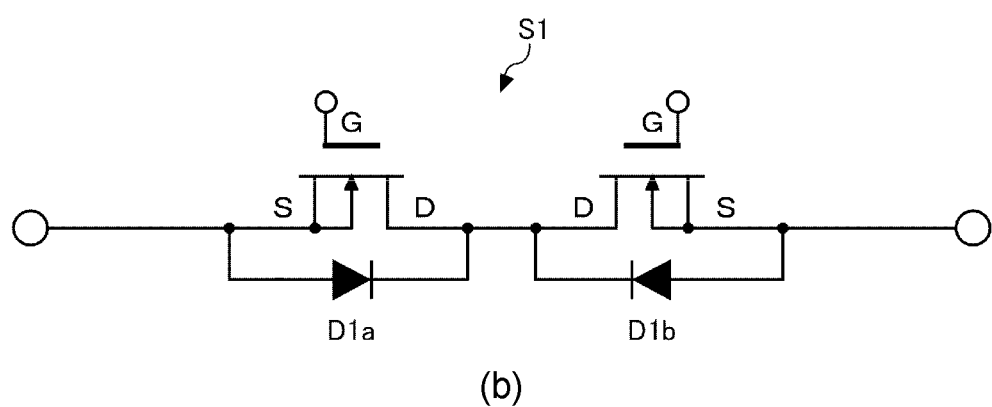

FIGS. 11(a) to 11(b) are diagrams showing a circuit configuration example when first switch S1 includes two N-channel MOSFETs. FIG. 11(a) shows an example in which the source terminals of two N-channel MOSFETs are connected to each other to form a bidirectional switch. In this case, since the anodes of two body diodes D1a, D1b in series face each other, the current is prevented from flowing through the body diodes between both ends of the bidirectional switch.

FIG. 11(b) shows an example in which the drain terminals of two N-channel MOSFETs are connected to each other to form a bidirectional switch. In this case, since the cathodes of two body diodes D1a, D1b in series face each other, the current is prevented from flowing through the body diodes between both ends of the bidirectional switch.

Comparing the configuration example of FIG. 11(a) and the configuration example of FIG. 11(b), the configuration example of FIG. 11(a) has a merit that power supply circuits (DC/DC converters) of gate drivers of the two N-channel MOSFETs can be shared. In the configuration example shown in FIG. 11(a), since the source potential is common in the two N-channel MOSFETs, the power supply voltages of the two gate drivers can be shared. Therefore, the power supply circuits (DC/DC converters) that supply the power supply voltages to the two gate drivers can also be shared. As a result, the cost and the circuit area can be reduced. On the other hand, in the configuration example shown in FIG. 11(b), the source potentials of the two N-channel MOSFETs cannot be shared, so it is necessary to separately provide power supply circuits (DC/DC converters) that supply the power supply voltages to the two gate drivers.

Figure 12:
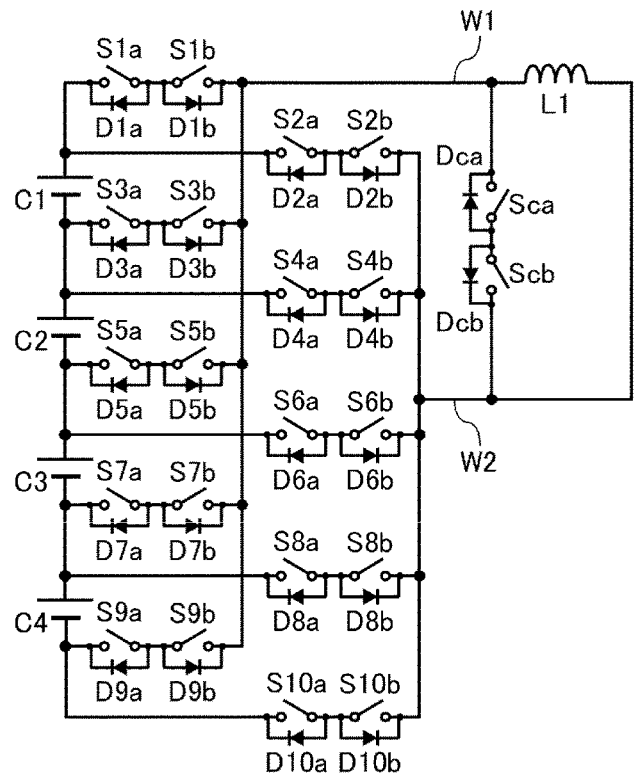
FIGS. 12(a) to 12(b) are diagrams comparing the configuration of the power storage system according to the comparative example and the configuration of the power storage system according to the exemplary embodiment shown in FIG. 9.
Figure 12:
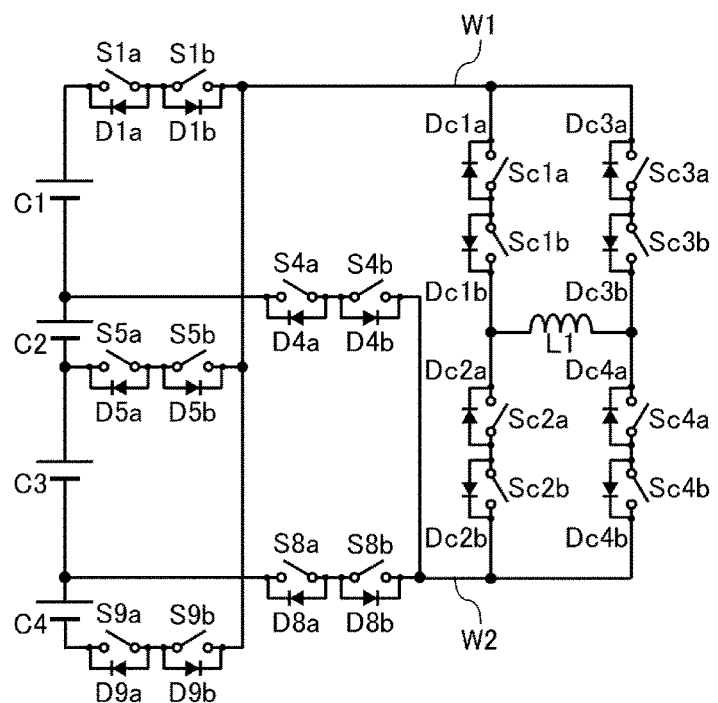

FIGS. 12(a) to 12(b) are diagrams comparing the configuration of power storage system 1 according to the comparative example and the configuration of power storage system 1 according to the exemplary embodiment shown in FIG. 9. FIG. 12(a) shows the configuration of power storage system 1 according to the comparative example. In the comparative example, cell selection circuit 11 has (n+1) first wiring side switches and (n+1) second wiring side switches. The (n+1) first wire side switches are connected between the respective nodes of the n cells connected in series and first wiring W1, respectively. The (n+1) second wiring side switches are connected between the respective nodes of the n cells connected in series and second wiring W2, respectively.

In the example shown in FIG. 12(a), n=4 and the number of nodes=5, and cell selection circuit 11 has five first wiring side switches and five second wiring side switches. In FIG. 12(a), first switch S1, third switch S3, fifth switch S5, seventh switch S7, and ninth switch S9 are the first wiring side switches, and second switch S2, fourth switch S4, sixth switch S6, eighth switch S8, and tenth switch S10 are the second wiring side switches.

Energy holding circuit 12 includes inductor L1 and clamp switch Sc. Clamp switch Sc is a switch for electrically connecting both ends of inductor L1 in energy holding circuit 12. Energy holding circuit 12 can form a closed loop including inductor L1 in a state where cell selection circuit 11 does not select any cell. That is, when clamp switch Sc is controlled to be an on state, a closed loop including inductor L1 and clamp switch Sc is formed.

In the example shown in FIG. 12(a), the bidirectional switch shown in the configuration example of FIG. 11(a) is used for first switch S1 to tenth switch S10 and clamp switch Sc. Therefore, cell selection circuit 11 uses 20 switching elements, energy holding circuit 12 uses two switching elements, and a total of 22 switching elements are used.

FIG. 12(b) shows the configuration of power storage system 1 according to the exemplary embodiment. In the example shown in FIG. 12(b), the bidirectional switch shown in the configuration example of FIG. 11(a) is used for first switch S1, fourth switch S4, fifth switch S5, eighth switch S8, ninth switch S9, first clamp switch Sc1, second clamp switch Sc2, third clamp switch Sc3, and fourth clamp switch Sc4. Therefore, cell selection circuit 11 uses 10 switching elements, energy holding circuit 12 uses 8 switching elements, and a total of 18 switching elements are used.

Figure 13:
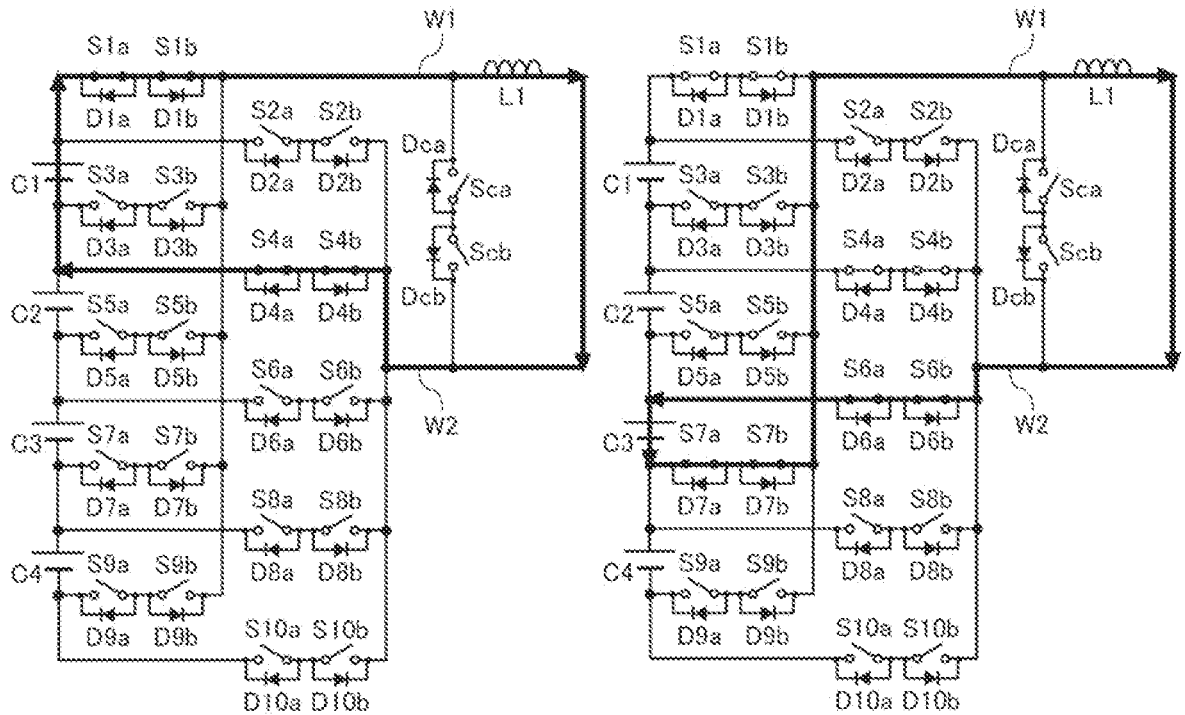
FIGS. 13(a) to 13(c) are circuit diagrams for explaining the sequence of energy transfer from a first cell to a third cell of the power storage system according to the comparative example.
Figure 13:
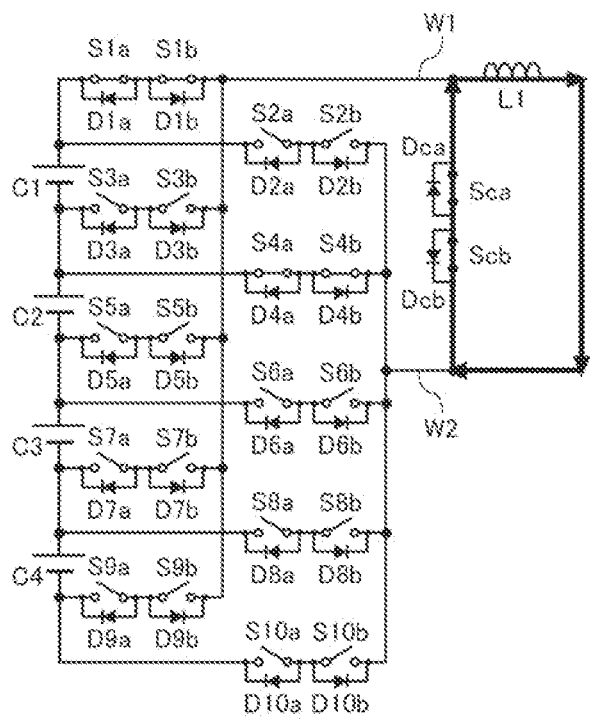

FIGS. 13(a) to 13(c) are circuit diagrams for explaining the sequence of energy transfer from first cell C1 to third cell C3 of power storage system 1 according to the comparative example.

In the first state shown in FIG. 13(a), controller 13 controls 1.1th switching element S1a, 1.2th switching element S1b, 4.2th switching element S4b, and 4.1th switching element S4a to an on state, and controls the other switching elements to an off state. The first state is a state in which inductor L1 is excited by the energy discharged from first cell C1.

In the second state shown in FIG. 13(b), controller 13 controls first clamp switching element Sca and second clamp switching element Scb to an on state, and controls the other switching elements to an off state. The second state is a state in which a circulating current flows through inductor L1 via second clamp switching element Scb and first clamp switching element Sca, and the current of inductor L1 is actively clamped.

In the third state shown in FIG. 13(c), controller 13 controls 6.2th switching element S6b, 6.1th switching element S6a, 7.1th switching element S7a, and 7.2th switching element S7b to an on state, and controls the other switching elements to an off state. The third state is a state in which a current flows from inductor L1 to third cell C3, and inductor L1 is demagnetized.

FIGS. 14(a) to 14(d) are circuit diagrams for explaining the sequence of energy transfer from first cell C1 to second cell C2 and third cell C3 of power storage system 1 according to the exemplary embodiment.

Figure 14:
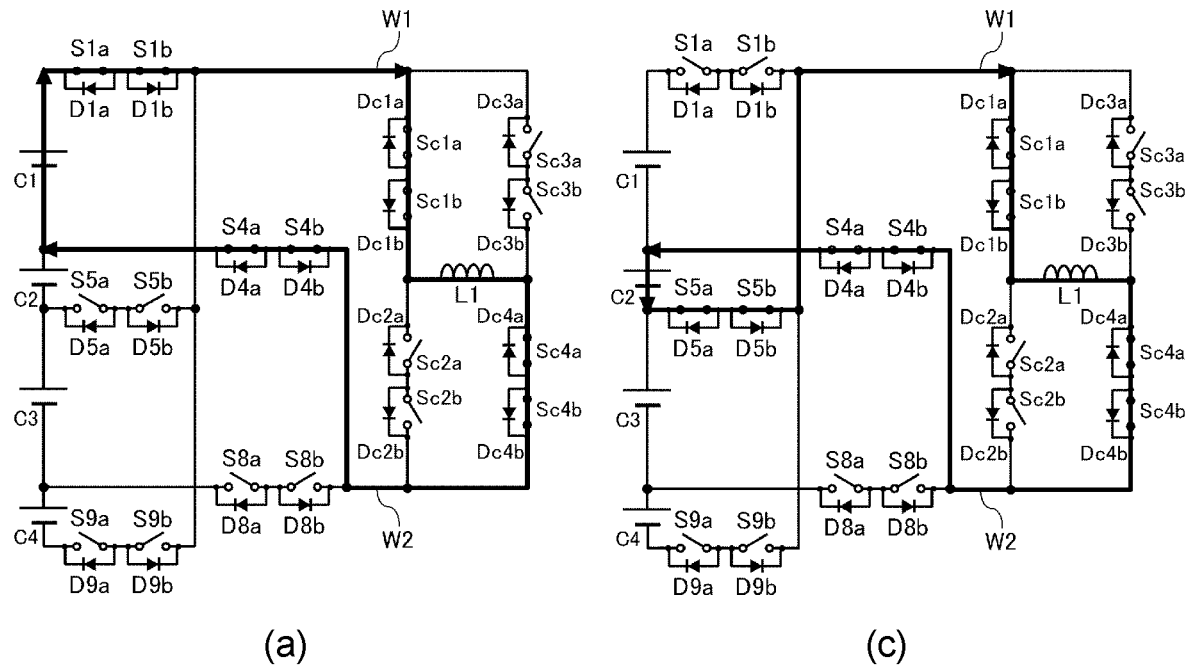
FIGS. 14(a) to 14(d) are circuit diagrams for explaining the sequence of energy transfer from a first cell to a second cell and a third cell of the power storage system according to the exemplary embodiment shown in FIG. 9.
Figure 14:
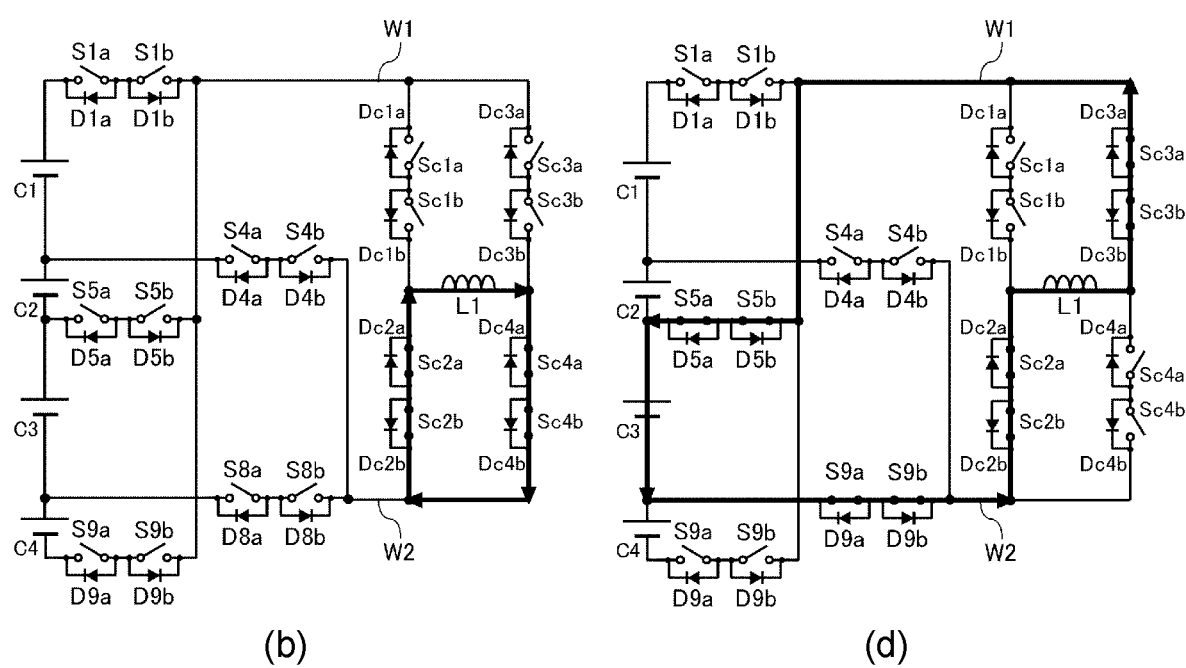

In the first state shown in FIG. 14(a), controller 13 controls 1.1th switching element S1a, 1.2th switching element S1b, 1.1th clamp switching element Sc1a, 1.2th clamp switching element Sc1b, 4.1th clamp switching element Sc4a, 4.2th clamp switching element Sc4b, 4.2th switching element S4b, and 4.1th switching element S4a to an on state, and controls the other switching elements to an off state. The first state is a state in which inductor L1 is excited by the energy discharged from first cell C1.

In the second state shown in FIG. 14(b), controller 13 controls 4.1th clamp switching element Sc4a, 4.2th clamp switching element Sc4b, 2.2th clamp switching element Sc2b, and 2.1th clamp switching element Sc2a to an on state, and controls the other switching elements to an off state. The second state is a state in which a circulating current flows through inductor L1 via 4.1th clamp switching element Sc4a, 4.2th clamp switching element Sc4b, 2.2th clamp switching element Sc2b, and 2.1th clamp switching element Sc2a, and the current of inductor L1 is actively clamped.

In the third state shown in FIG. 14(c), controller 13 controls 4.1th clamp switching element Sc4a, 4.2th clamp switching element Sc4b, 4.2th switching element S4b, 4.1th switching element S4a, 5.1th switching element S5a, 5.2th third switching element S5b, 1.1th clamp switching element S1a, and 1.2th clamp switching element Sc1b to an on state, and controls the other switching elements to an off state. The third state is a state in which a current flows from inductor L1 to second cell C2, and inductor L1 is demagnetized.

In the fourth state shown in FIG. 14(d), controller 13 controls 3.1th clamp switching element Sc3a, 3.2th clamp switching element Sc3b, 5.2th switching element S5b, 5.1th switching element S5a, 9.1th switching element S9a, 9.2th switching element S9b, 2.1th clamp switching element Sc2a, and 2.2th clamp switching element Sc2b to an on state, and controls the other switching elements to an off state. The fourth state is a state in which a current flows from inductor L1 to third cell C3, and inductor L1 is demagnetized.

When the energy discharged from first cell C1 is charged to second cell C2, controller 13 makes transition from the second state to the third state. When the energy discharged from first cell C1 is charged to third cell C3, transition is made from the second state to the fourth state.

By the way, the switching timing of the switching element varies due to changes in temperature and threshold level. Therefore, it is difficult to turn on and off the plurality of switching elements included in cell selection circuit 11 and the plurality of switching elements included in energy holding circuit 12 at the ideal timing intended by the designer. Due to the deviation in the switching timing of these switching elements, an external short circuit may occur in the discharge cell when inductor L1 makes transition from the excited state to the active clamp state. In addition, dielectric breakdown may occur in the switching element in the discharge path. Similarly, due to the deviation in the switching timing, an external short circuit may occur in the charging cell when transition is made from the active clamp state to the demagnetized state. In addition, dielectric breakdown may occur in the switching element in the charging path.

For example, in the basic operation sequence shown in FIGS. 10(a) to 10(h), when inductor L1 makes transition from the excited state shown in FIG. 10(a) to the active clamp state shown in FIG. 10(b), an external short circuit may occur in first cell C1, or dielectric breakdown may occur in first switch S1, fourth switch S4, or first clamp switch Sc1. In addition, when transition is made from the active clamp state shown in FIG. 10(b) to the demagnetization state shown in FIG. 10(c), an external short circuit may occur in second cell C2, or dielectric breakdown may occur in fourth switch S4, fifth switch S5, or first clamp switch Sc1.

Therefore, in the present exemplary embodiment, a dead time is inserted during the transition from the excited state to the active clamp state of inductor L1. Similarly, a dead time is inserted during the transition from the active clamp state to the demagnetization state.

When inductor L1 makes transition from the excited state shown in FIG. 14(a) to the active clamp state shown in FIG.

14(b), controller 13 first turns on 2.2th clamp switching element Sc2b. Next, 1.1th switching element S1a, 4.2th switching element S4b, and 1.1th clamp switching element Sc1a are turned off. Finally, 1.2th switching element S1b, 4.1th switching element S4a, and 1.2th clamp switching element Sc1b are turned off, and 2.1th clamp switching element Sc2a is turned on.

During the transition from the excited state shown in FIG. 14(a) to the active clamp state shown in FIG. 14(b) of inductor L1, 2.2th clamp switching element Sc2b is turned on to form a path in which body diode Dc2a of 2.1th clamp switching element Sc2a is interposed between both ends of inductor L1. Even if 2.2th clamp switching element Sc2b is turned on, first cell C1 is not short-circuited externally because of body diode Dc2a of 2.1th clamp switching element Sc2a. In this state, both ends of inductor L1 are electrically connected when one of 1.1th switching element S1a, 4.2th switching element S4b, and 1.1th clamp switching element Sc1a is turned off. Therefore, even if the turn-off timings of 1.1th switching element S1a, 4.2th switching element S4b and 1.1th clamp switching element Sc1a are deviated, dielectric breakdown does not occur in 1.1th switching element S1a, 4.2th switching element S4b, or 1.1th clamp switching element Sc1a.

Note that, during the dead time, a current flows through body diode Dc2a of 2.1th clamp switching element Sc2a, so that a loss corresponding to forward voltage drop Vf of body diode Dc2a and the amount of current occurs. Therefore, the dead time is a time during which the above-mentioned external short circuit and dielectric breakdown do not occur, and it is desirable to set the dead time as short as possible.

Controller 13 first turns off 2.1th clamp switching element Sc2a when transition is made from the active clamp state shown in FIG. 14(b) to the demagnetization state shown in FIG. 14(c). Next, 4.2th switching element S4b, 5.1th switching element S5a, and 1.1th clamp switching element S1a are turned on. Next, 2.2th clamp switching element Sc2b is turned off. Finally, 4.1th switching element S4a, 5.2th switching element S5b, and 1.2th clamp switching element Sc1b are turned on.

During the transition from the active clamp state shown in FIG. 14(b) to the demagnetization state shown in FIG. 14(c), 4.2th switching element S4b, 5.1th switching element S5a, and 1.1th clamp switching element S1a are turned on to form a path in which between inductor L1 and second cell C2, 4.2th switching element S4b, body diode D4a of 4.1th switching element S4a, 5.1th switching element S5a, body diode D5b of 5.2th switching element S5b, 1.1th clamp switching element S1a, and body diode Dc1b of 1.2th clamp switching element Sc1b are interposed.

In this state, when both 2.1th clamp switching element Sc2a and 2.2th clamp switching element Sc2b are turned off and inductor L1 can charge second cell C2, even if one of 4.1th switching element S4a, 5.2th switching element S5b, and 1.2th clamp switching element Sc1b is turned on, a high voltage is not generated between both ends of the two switching elements that are not turned on. Therefore, even if the turn-on timings of 4.1th switching element S4a, 5.2th switching element S5b, and 1.2th clamp switching element Sc1b are deviated, dielectric breakdown does not occur in 4.1th switching element S4a, 5.2th switching element S5b, or 1.2th clamp switching element Sc1b. In addition, since 2.1th clamp switching element Sc2a, 2.2th clamp switching element Sc2b, 4.1th switching element S4a, 4.2th switching element S4b, 5.1th switching element S5a, 5.2th switching element S5b, 1.1th clamp switching element S1a, and 1.2th clamp switching element Sc1b are also prevented from turning on at the same time, second cell C2 is not short-circuited externally.

Figure 15:
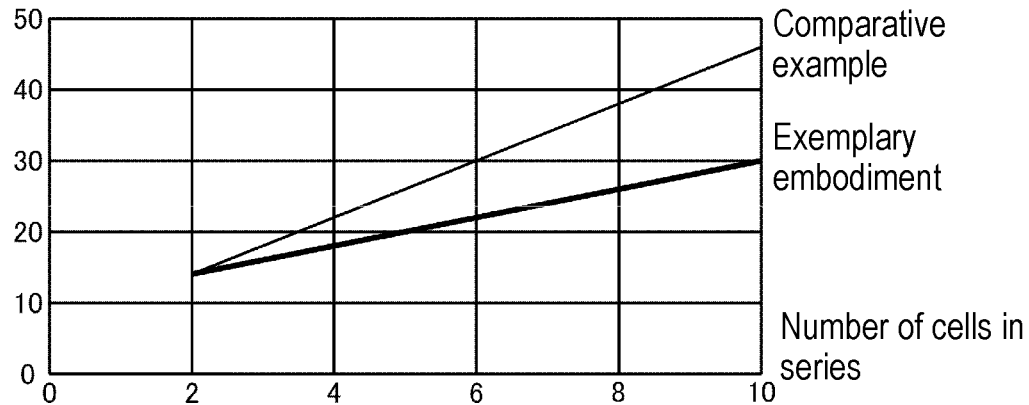
FIG. 15 is a graph showing a number of switching elements used in the equalization circuit according to the exemplary embodiment shown in FIG. 9 and the equalization circuit according to the comparative example.

FIG. 15 is a graph showing the number of switching elements used in the equalization circuit according to the present exemplary embodiment and the equalization circuit according to the comparative example. The horizontal axis shows the number of cells in series n, and the vertical axis shows the number of switching elements. The number of switching elements required in the comparative example is 4(n+1)+2, and the number of switching elements required in the present exemplary embodiment is 2(n+1)+8. Comparing the comparative example and the present exemplary embodiment, it can be seen that the reduction effect of the switching element becomes larger in the present exemplary embodiment as the number of cells in series increases.

As described above, according to the present exemplary embodiment, by providing energy holding circuit 12 with eight full-bridge type clamp switches, it is possible to switch the direction of the current discharged from inductor L1 by control. Therefore, the number of switching elements included in cell selection circuit 11 can be halved. In the comparative example, since the direction of the current discharged from inductor L1 cannot be switched, it is necessary to provide two current paths for discharging and charging at each node of each cell. In this regard, in the present exemplary embodiment, since the discharge and charge paths can be combined into one, a number of current paths can be halved, and the number of switching elements inserted in the current path can also be halved. Further, the drive circuit for driving the gate of the switching element can also be halved. Therefore, the cost can be reduced and the circuit area can be reduced.

Figure 16:
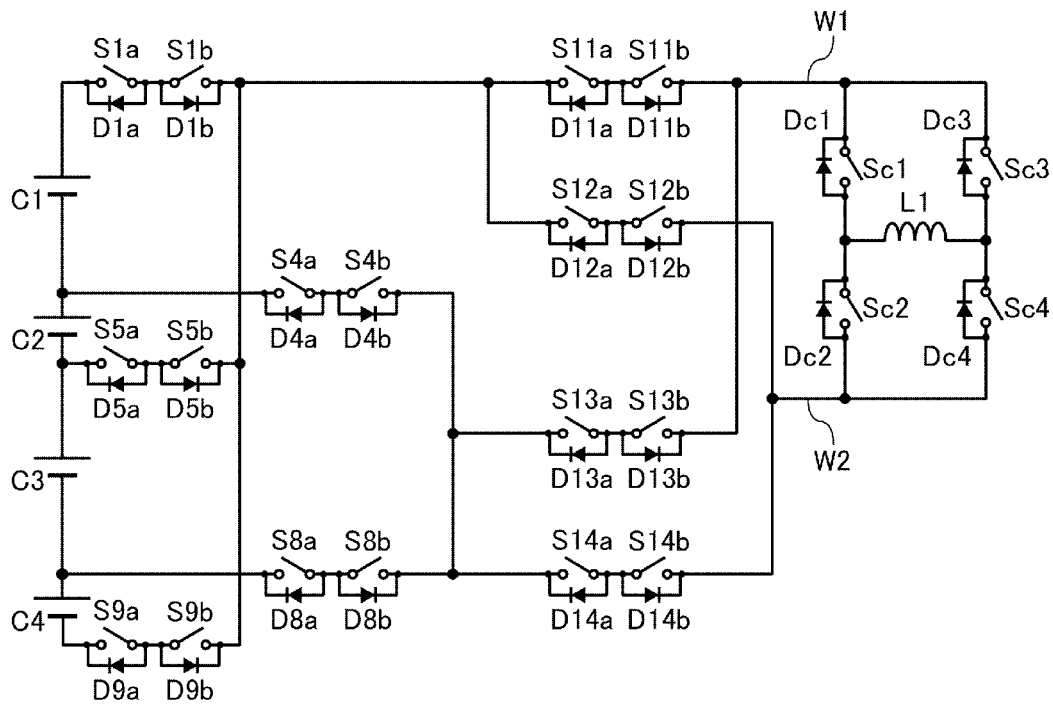
FIG. 16 is a diagram showing a configuration of a modified example of the power storage system shown in FIG. 12(b).

FIG. 16 is a diagram showing a configuration of a modified example of the power storage system shown in FIG. 12(b). In the modified example shown in FIG. 16, first clamp switch Sc1 to fourth clamp switch Sc4 each include one switching element, and have body diodes Dc1 to Dc4 formed in antiparallel, respectively. Among the (n+1) nodes of the n cells connected in series, odd-numbered nodes can be connected to first wiring W1 via eleventh switch S11 and can be connected to second wiring W2 via twelfth switch S12. Among the (n+1) nodes of the n cells connected in series, even-numbered nodes can be connected to first wiring W1 via thirteenth switch S13, and can be connected to second wiring W2 via fourteenth switch S14.

Controller 13 controls eleventh switch S11, twelfth switch S12, thirteenth switch S13, and fourteenth switch S14 so as to connect the higher-voltage nodes to first wiring W1 and the lower-voltage nodes to second wiring W2 among the nodes at both ends of the cell to be discharged or charged. The bidirectional switch shown in the configuration example of FIG. 11(a) is used for first switch S1, fourth switch S4, fifth switch S5, eighth switch S8, ninth switch S9, eleventh switch S11, twelfth switch S12, thirteenth switch S13, and fourteenth switch S14. Therefore, cell selection circuit 11 uses ten switching elements, a polarity switching circuit uses eight switching elements, energy holding circuit 12 uses four switching elements, and a total of 22 switching elements are used. The general formula is 2(n+1)+12.

In the above-described exemplary embodiment, an example in which a MOSFET is used as a switching element has been described. In this regard, a semiconductor switching element such as an insulated gate bipolar transistor (IGBT) in which a parasitic diode is not formed may be used. In that case, an external diode is connected in parallel to the semiconductor switching element instead of the parasitic diode. The lower the forward voltage drop Vf is used, the smaller the loss in the dead time can be and the higher the efficiency is.

Further, in the above-described exemplary embodiment, an example of equalizing a plurality of cells connected in series by an active method has been described. In this regard, the equalization circuit according to the exemplary embodiment can be used to equalize a plurality of modules connected in series. The "cell" in the present specification may be appropriately read as a "module".

Figure 17:
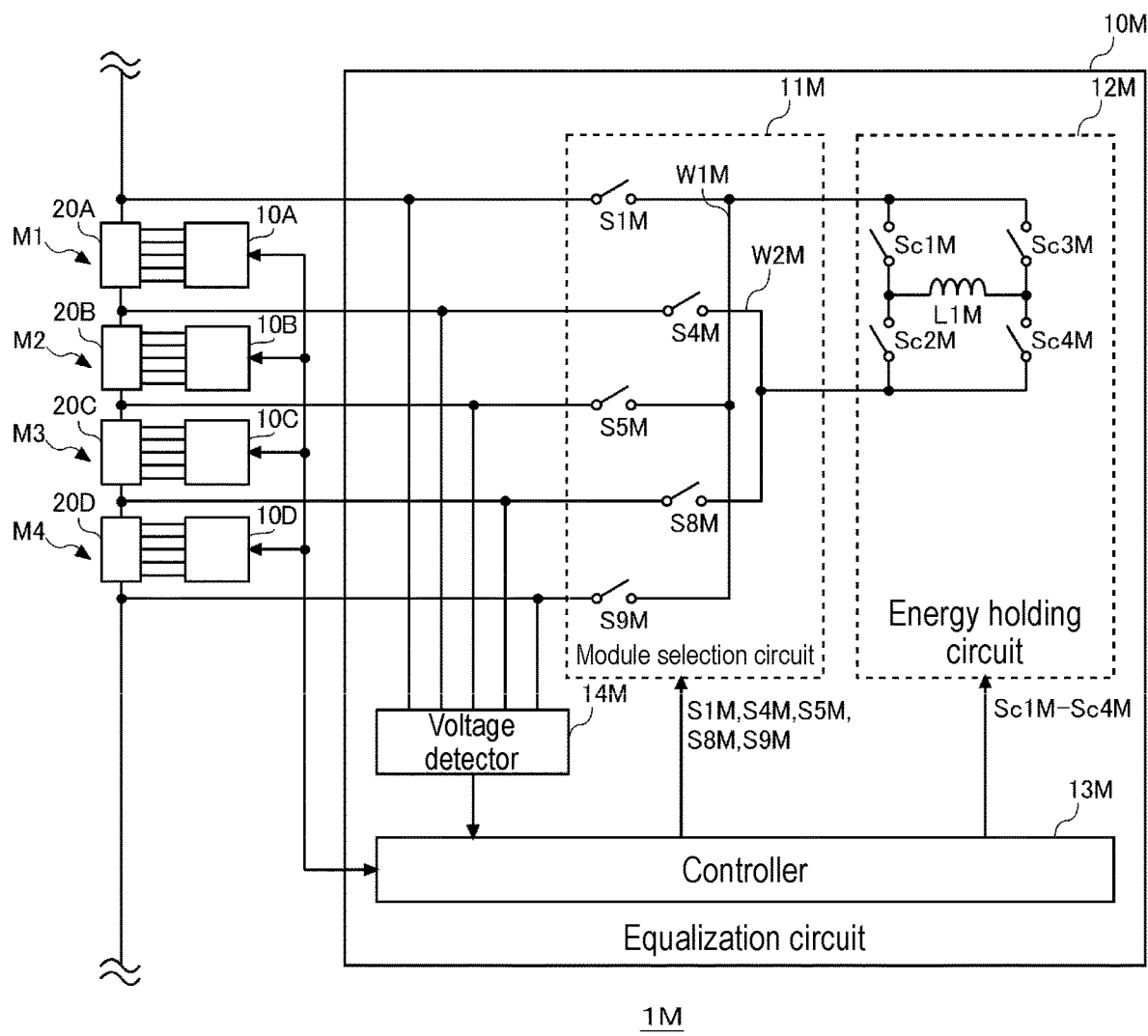
FIG. 17 is a diagram showing a configuration of a power storage system according to another modified example of the present invention.

FIG. 17 is a diagram showing a configuration of a power storage system according to another exemplary embodiment of the present invention. FIG. 17 shows an exemplary embodiment of a power storage system including an equalization circuit that equalizes a plurality of modules connected in series. In FIG. 17, each of the plurality of modules includes a cell equalization circuit and a power storage unit in which a plurality of cells are connected in series, as in power storage system 1 shown in FIG. 9. First module M1 includes cell equalization circuit 10A and power storage unit 20A, second module M2 includes cell equalization circuit 10B and power storage unit 20B, third module M3 includes cell equalization circuit 10C and power storage unit 20C, and fourth module M4 includes cell equalization circuit 10D and power storage unit 20D.

Module equalization circuit 10M includes voltage detector 14M, module selection circuit 11M, energy holding circuit 12M, and controller 13M.

In the present exemplary embodiment, controller 13M executes equalization processing among m modules connected in series by an active module balance method. In the active module balance method according to the present exemplary embodiment, energy is transferred from one module (module to be discharged) to another module (module to be charged) among m modules connected in series, thereby equalizing the capacities of one module and the other module. That is, module equalization circuit 10M functions as an energy transfer circuit that transfers energy between any two modules, and by repeating this energy transfer, equalizes the capacities among m modules connected in series.

In addition to the above equalization processing among a plurality of modules, equalization processing among a plurality of cells connected in series in each module is performed. The equalization processing among a plurality of cells connected in series in each module may be executed in a multiplexed manner with the equalization processing among a plurality of modules. In this case, module equalization circuit 10M and cell equalization circuits 10A to 10D are operated in cooperation with each other by communication. The equalization processing among modules is preferably executed with priority over the equalization processing among cells, and after the equalization processing among modules is completed, the equalization processing among cells is completed, and thereby it is possible to eliminate the voltage difference of each cell generated by executing the equalization processing among modules.

In module equalization circuit 10M of the present exemplary embodiment, module selection circuit 11M and energy holding circuit 12M are configured by the same circuit as that of cell equalization circuit 1 shown in FIG. 9, but module selection circuit 11M and energy holding circuit 12M may have the same circuit configuration as that of cell equalization circuit 1 shown in FIG. 1 or FIG. 8.

Further, in each of the above-described exemplary embodiments, the equalization circuit of the active cell balance method has been described, but it can also be applied to energy transfer not intended for equalization among a plurality of cells and modules. For example, if the temperatures of two modules are significantly different, at least a portion of the energy of a module having a high temperature may be transferred to a module having a low temperature in order to reduce storage degradation.

The present invention has been described above based on the exemplary embodiments. It will be understood by those skilled in the art that the exemplary embodiments are merely examples, various modified examples are available in each component thereof or in a combination of each processing process, and such modified examples still fall within the scope of the present invention.

It should be noted that the exemplary embodiments may be specified by the following items.

[Item 1]

Energy transfer circuit (10) including:

inductor (L1);

cell selection circuit (11) provided between n (n is an integer of two or more) cells (C1 to C4) connected in series and inductor (L1), and capable of electrically connecting both ends of any cell of n cells (C1 to C4) and both ends of inductor (L1);

clamp switch (Sc) for forming a closed loop including inductor (L1) in a state where cell selection circuit (11) does not select any cell; and controller (13) that controls cell selection circuit (11) and clamp switch (Sc), in which controller (13)

controls cell selection circuit (11) to electrically connect both ends of a cell to be discharged among n cells (C1 to C4) and both ends of inductor (L1) for a predetermined time, controls cell selection circuit (11) to electrically cut off n cells (C1 to C4) and inductor (L1), and turn on clamp switch (Sc), and turns off clamp switch (Sc), and controls cell selection circuit (11) to electrically connect both ends of a cell to be charged among n cells (C1 to C4) and both ends of inductor (L1) for a predetermined time.

According to this, energy transfer circuit (10) that equalizes the capacities of a plurality of cells (C1 to C4) by using inductor (L1) can be achieved with a small number of elements.

[Item 2]

Energy transfer circuit (10) according to item 1, in which cell selection circuit (11) includes first wiring (W1) connected to one end of inductor (L1), second wiring (W2) connected to another end of inductor (L1), (n+1) first wiling side switches (S1, S3, S5, S7, S9) connected between each node of n cells (C1 to C4) connected in series and first wiring (W1), respectively, and (n+1) second wiring side switches (S2, S4, S6, S8, S10) connected between each node of n cells (C1 to C4) connected in series and second wiring (W2), respectively.

According to this, it is possible to achieve energy transfer circuit (10) that performs equalization of the active method using inductor (L1) with a small number of switches.

[Item 3]

Energy transfer circuit (10) according to item 1 or 2, in which n is an integer of five or more.

As a number of cells in series (n) increases, the element reduction effect increases.

[Item 4]
An energy transfer circuit (10) including:
inductor (L1);
cell selection circuit (11) provided between n (n is an integer of two or more) cells (C1 to C4) connected in series and inductor (L1), and capable of electrically connecting both ends of any cell of n cells (C1 to C4) and both ends of inductor (L1);
four clamp switches (Sc1 to Sc4) that are fully bridge-connected for forming a closed loop including inductor (L1) in a state where cell selection circuit (11) does not select any cell (C1 to C4); and
controller (13) that controls cell selection circuit (11) and four clamp switches (Sc1 to Sc4), in which
cell selection circuit (11) includes
first wiring (W1) connected to one end of inductor (L1),
second wiring (W2) connected to another end of inductor (L1),
a plurality of first wiring side switches (S1, S5, S9) connected between odd-numbered nodes and first wiring (W1), respectively, among respective (n+1) nodes of n cells (C1 to C4) connected in series, and
at least one second wiring side switch (S4, S8) connected between even-numbered nodes and second wiring (W2), respectively, among the respective (n+1) nodes of n cells (C1 to C4) connected in series,
among four clamp switches (Sc1 to Sc4), a first arm having first clamp switch (Sc1) and second clamp switch (Sc2) connected in series and a second arm having third clamp switch (Sc3) and fourth clamp switch (Sc4) connected in series are connected in parallel between first wiring (W1) and second wiring (W2), and
inductor (L1) is connected between a node between first clamp switch (Sc1) and second clamp switch (Sc2) and a node between third clamp switch (Sc3) and fourth clamp switch (Sc4).
According to this, energy transfer circuit (10) between a plurality of cells (C1 to C4) using inductor (L1) can be achieved with a small number of elements.
[Item 5]
Energy transfer circuit (10) according to item 4, in which controller (13) controls, in this order,
a first state for controlling first wiring side switch (S1) and second wiring side switch (S4) connected to the nodes on both sides of discharge cell (C1) to be discharged among n cells (C1 to C4) to an on state, and first clamp switch (Sc1) and fourth clamp switch (Sc4) or second clamp switch (Sc2) and third clamp switch (Sc3) to an on state,
a second state for controlling first wiring side switch (S1) and second wiring side switch (S4) connected to the nodes on both sides of discharge cell (C1) to an off state, and second clamp switch (Sc2) and fourth clamp switch (Sc4) or first clamp switch (Sc1) and third clamp switch (Sc3) to an on state, and
a third state for controlling first wiring side switch (S5) and second wiring side switch (S4) connected to the nodes on both sides of charging cell (C2) to be charged among n cells (C1 to C4) to an on state, and first clamp switch (Sc1) and fourth clamp switch (Sc4), or second clamp switch (Sc2) and third clamp switch (Sc3) to an on state to allow a current to flow through charging cell (C2).
According to this, energy transfer can be performed between any two cells.

[Item 6]
Energy transfer circuit (10) according to item 4 or 5, in which
each of the plurality of first wiring side switches (S1, S5, S9) includes two switching elements (S1a, S1b/S5a, S5b/S9a, S9b) each having body diode (D1a, D1b/D5a, D5b/D9a, D9b) connected in series in opposite directions, and
each of at least one second wiring side switch (S4, S8) includes two switching elements (S4a, S4b/S8a, S8b) each having body diode (D4a, D4b/D8a, D8b) connected in series in opposite directions.
According to this, first wiring side switch (S1, S5, S9) and second wiring side switch (S4, S8) can be safely switched.
[Item 7]
Energy transfer circuit (10) according to any one of items 4 to 6, in which each of four clamp switches (Sc1 to Sc4) includes two switching elements (Sc1a, Sc1b/Sc2a, Sc2b/Sc3a, Sc3b/Sc4a, Sc4b) each having body diode (Dc1a, Dc1b/Dc2a, Dc2b/Dc3a, Dc3b/Dc4a, Dc4b) connected in series in opposite directions.
According to this, clamp switch (Sc1 to Sc4) can be safely switched.
[Item 8]
Energy transfer circuit (10) according to any one of items 4 to 7, further comprising voltage detector (14) that detects a voltage of each of n cells (C1 to C4), in which controller (13) executes equalization processing between n cells (C1 to C4) based on the voltages of n cells (C1 to C4) detected by voltage detector (14).
According to this, it is possible to achieve an equalization circuit using energy transfer.
[Item 9]
Energy transfer circuit (10) according to item 8, in which controller (13) determines a target voltage or a target capacity of n cells (C1 to C4) based on the voltages of n cells (C1 to C4) detected by voltage detector (14), determines a cell having a voltage or a capacity higher than the target voltage or the target capacity as a cell to be discharged, and determines a cell having a voltage or a capacity lower than the target voltage or the target capacity as a cell to be charged.
According to this, active cell balance can be achieved by energy transfer between cells (C1 to C4).
[Item 10]
Power storage system (1), including:
n (n is an integer of two or more) cells (C1 to C4) connected in series; and
energy transfer circuit (10) according to any one of items 4 to 9.
According to this, it is possible to construct power storage system (1) that achieves energy transfer circuit (10) between a plurality of cells (C1 to C4) using inductor (L1) with a small number of elements.
[Item 11]
Energy transfer circuit (10), including:
inductor (L1);
module selection circuit (11) provided between n (n is an integer of two or more) modules (C1 to C4) connected in series and inductor (L1), and capable of electrically connecting both ends of any of n modules (C1 to C4) and both ends of inductor (L1);
clamp switch (Sc) for forming a closed loop including inductor (L1) in a state where module selection circuit (11) does not select any module; and
controller (13) that controls module selection circuit (11) and clamp switch (Sc), in which controller (13)

controls module selection circuit (11) to electrically connect both ends of a module to be discharged among n modules (C1 to C4) and both ends of inductor (L1) for a predetermined time, controls module selection circuit (11) to electrically cut off n modules (C1 to C4) and inductor (L1), and turn on clamp switch (Sc), and turns off clamp switch (Sc), and controls module selection circuit (11) to electrically connect both ends of a module to be charged among n modules (C1 to C4) and both ends of inductor (L1) for a predetermined time.

According to this, it is possible to achieve energy transfer circuit (10) that equalizes the capacities of a plurality of modules (C1 to C4) by using inductor (L1) with a small number of elements.

[Item 12]

Energy transfer circuit (10M) including:

inductor (L1M);

module selection circuit (11M) provided between m (m is an integer of two or more) modules (M1 to M4) connected in series and inductor (L1M), and capable of electrically connecting both ends of any module of m modules (M1 to M4) and both ends of inductor (L1M);

four clamp switches (Sc1M to Sc4M) that are fully bridge-connected for forming a closed loop including inductor (L1M) in a state where module selection circuit (11M) does not select any module (M1 to M4); and controller (13) that controls module selection circuit (11M) and four clamp switches (Sc1M to Sc4M), in which module selection circuit (11M) includes first wiring (W1M) connected to one end of inductor (L1M), second wiring (W2M) connected to another end of inductor (L1M), a plurality of first wiring side switches (S1M, S5M, S9M) connected between odd-numbered nodes and first wiring (W1M), respectively, among respective (m+1) nodes of m modules (M1 to M4) connected in series, and at least one second wiring side switch (S4M, S8M) connected between even-numbered nodes and second wiring (W2M), respectively, among the respective (m+1) nodes of m modules (M1 to M4) connected in series, among four clamp switches (Sc1M to Sc4M), a first arm having first clamp switch (Sc1M) and second clamp switch (Sc2M) connected in series and a second arm having third clamp switch (Sc3M) and fourth clamp switch (Sc4M) connected in series are connected in parallel between first wiring (W1M) and second wiring (W2M), and inductor (L1M) is connected between a node between first clamp switch (Sc1M) and second clamp switch (Sc2M) and a node between third clamp switch (Sc3M) and fourth clamp switch (Sc4M).

According to this, it is possible to achieve energy transfer circuit (10M) between a plurality of modules (M1 to M4) using inductor (L1M) with a small number of elements.

[Item 13]

Energy transfer circuit (10M) according to item 12, in which controller (13M) controls, in this order, a first state for controlling first wiring side switch (S1M) and second wiring side switch (S4M) connected to the nodes on both sides of discharge module (M1) to be discharged among m modules (M1 to M4) to an on state, and first clamp switch (Sc1M) and fourth clamp switch (Sc4M) or second clamp switch (Sc2M) and third clamp switch (Sc3M) to an on state, a second state for controlling first wiring side switch (S1M) and second wiring side switch (S4M) connected to the nodes on both sides of discharge module (M1) to an off state, and second clamp switch (Sc2M) and fourth clamp switch (Sc4M) or first clamp switch (Sc1M) and third clamp switch (Sc3M) to an on state, and a third state for controlling first wiring side switch (S5M) and second wiring side switch (S4M) connected to the nodes on both sides of charging module (M2) to be charged among m modules (M1 to M4) to an on state, and first clamp switch (Sc1M) and fourth clamp switch (Sc4M), or second clamp switch (Sc2M) and third clamp switch (Sc3M) to an on state to allow a current to flow through charging module (M2).

According to this, energy transfer can be performed between any two modules.

[Item 14]

Energy transfer circuit (10M) according to item 12 or 13, in which each of the plurality of first wiling side switches (S1M, S5M, S9M) includes two switching elements (S1a, S1b/S5a, S5b/S9a, S9b) each having body diode (D1a, D1b/D5a, D5b/D9a, D9b) connected in series in opposite directions, and each of at least one second wiring side switch (S4M, S8M) includes two switching elements (S4a, S4b/S8a, S8b) each having body diode (D4a, D4b/D8a, D8b) connected in series in opposite directions.

According to this, first wiring side switch (S1M, S5M, S9M) and second wiring side switch (S4M, S8M) can be safely switched.

[Item 15]

Energy transfer circuit (10M) according to any one of items 12 to 14, in which each of four clamp switches (Sc1M to Sc4M) includes two switching elements (Sc1a, Sc1b/Sc2a, Sc2b/Sc3a, Sc3b/Sc4a, Sc4b) each having body diode (Dc1a, Dc1b/Dc2a, Dc2b/Dc3a, Dc3b/Dc4a, Dc4b) connected in series in opposite directions.

According to this, clamp switch (Sc1M to Sc4M) can be safely switched.

[Item 16]

Energy transfer circuit (10M) according to any one of items 11 to 15, further including voltage detector (14M) that detects a voltage of each of m modules (M1 to M4), in which controller (13M) executes equalization processing between m modules (M1 to M4) based on the voltages of m modules (M1 to M4) detected by voltage detector (14M).

According to this, it is possible to achieve an equalization circuit using energy transfer.

[Item 17]

Energy transfer circuit (10M) according to item 16, in which controller (13M) determines a target voltage or a target capacity of m modules (M1 to M4) based on the voltages of m modules (M1 to M4) detected by voltage detector (14M), determines a module having a voltage or a capacity higher than the target voltage or the target capacity as a module to be discharged, and determines a module having a voltage or a capacity lower than the target voltage or the target capacity as a module to be charged.

According to this, active module balance can be achieved by energy transfer between modules (M1 to M4).

[Item 18]

Energy transfer circuit (10M) according to item 16, in which
each of m modules (M1 to M4) includes
a plurality of cells (C1 to C4) connected in series,
cell voltage detector (14) that detects a cell voltage of each of the plurality of cells (C1 to C4), and
cell equalization circuit (10A to 10D) that equalizes a plurality of cell voltages in the same module (M1 to M4) based on the cell voltage detected by cell voltage detector (14), and cell equalization circuit (10A to 10D) operates in cooperation with controller (13M) by communication, and after the equalization processing between m modules (M1 to M4) is executed, the equalization processing between the plurality of cells (C1 to C4) is executed.

According to this, it is possible to efficiently achieve equalization of all cells by concurrently using the active module balance by energy transfer between modules (M1 to M4) and the active cell balance by energy transfer between cells (C1 to C4).

[Item 19]

Power storage system (1M) including:
m (m is an integer of two or more) modules (M1 to M4) connected in series; and
energy transfer circuit (10M) according to any one of items 11 to 18.

According to this, it is possible to construct power storage system (1M) in which energy transfer circuit (10M) between a plurality of modules (M1 to M4) using inductor (L1M) is achieved with a small number of elements.

REFERENCE MARKS IN THE DRAWINGS 1 power storage system
10 equalization circuit
11 cell selection circuit
12 energy holding circuit
13 controller
14 voltage detector
20 power storage unit
C1 first cell
C2 second cell
C3 third cell
C4 fourth cell
L1 inductor
W1 first wiring
W2 second wiring
S1 first switch
S1a 1.1th switching element
D10a, D10b body diode
S1b 1.2th switching element
S2 second switch
S2a 2.1th switching element
S2b 2.2th switching element
S3 third switch
S3a 3.1th switching element
S3b 3.2th switching element
S4 fourth switch
S4a 4.1th switching element
S4b 4.2th switching element
S5 fifth switch
S5a 5.1th switching element
S5b 5.2th switching element
D5b body diode
S6 sixth switch
S6a 6.1th switching element
S6b 6.2th switching element
S7 seventh switch
S7a 7.1th switching element
S7b 7.2th switching element
S8 eighth switch
S8a 8.1th switching element
S8b 8.2th switching element
S9 ninth switch
S9a 9.1th switching element
S9b 9.2th switching element
S10 tenth switch
S10a 10.1th switching element
S10b 10.2th switching element
Sc clamp switch
Sca first clamp switching element
Scb second clamp switching element
Sc1 first clamp switch
Sc2 second clamp switch
Sc3 third clamp switch
Sc4 fourth clamp switch
D1a, D1b, D2a, D2b, D3a, D3b, D4a, D4b, D5a, D6a, D6b, D7a, D7b, D8a, D8b, D9a, D9b, Dca, Dcb, Dc1, Dc2, Dc3, Dc4 body diode.

The invention claimed is:

1. An energy transfer circuit comprising:
an inductor;
a cell selection circuit provided between the inductor and n cells connected in series, where n is an integer of two or more, the cell selection circuit being configured to electrically connect both ends of any cell of the n cells to both ends of the inductor;
a clamp switch for forming a closed loop including the inductor in a state where the cell selection circuit does not select any cell; and
a controller that controls the cell selection circuit and the clamp switch,
wherein the controller is configured to:
cause the cell selection circuit to electrically connect both ends of a cell to be discharged among the n cells to both ends of the inductor for a predetermined time,
cause the cell selection circuit to electrically disconnect the n cells from the inductor, and turn on the clamp switch, and
turn off the clamp switch, and cause the cell selection circuit to electrically connect both ends of a cell to be charged among the n cells to both ends of the inductor for a predetermined time, and
the cell selection circuit includes:
a first wiring connected to one end of the inductor;
a second wiring connected to another end of the inductor;
(n+1) first wiring side switches each connected between the first wiring and a corresponding one of nodes of the n cells connected in series; and
(n+1) second wiring side switches connected each between the second wiring and a corresponding one of nodes of the n cells connected in series.

2. The energy transfer circuit according to claim 1, wherein n is an integer of five or more.

3. The energy transfer circuit according to claim 1, further comprising a voltage detector that detects a voltage of each of the n cells,
wherein the controller is configured to execute equalization processing among the n cells based on the voltages of the n cells detected by the voltage detector.

4. The energy transfer circuit according to claim 3, wherein the controller is configured to determine a target voltage or a target capacity of the n cells based on the voltages of the n cells detected by the voltage detector, determine a cell having a voltage or a capacity higher than the target voltage or the target capacity as a cell to be discharged, and determine a cell having a voltage or a capacity lower than the target voltage or the target capacity as a cell to be charged.

5. A power storage system, comprising:
the energy transfer circuit according to claim 1; and
the n cells, where n is an integer of two or more, connected in series.

6. An energy transfer circuit comprising:
an energy holding circuit including:
an inductor; and
four clamp switches that are fully bridge-connected;
a cell selection circuit provided between the energy holding circuit and n cells connected in series, where n is an integer of two or more, the cell selection circuit being configured to electrically connecting both ends of any cell of the n cells to both ends of the energy holding circuit;
and
a controller configured to cause the cell selection circuit and the four clamp switches, wherein:
the four clamp switches form a closed loop including the inductor in a state where the cell selection circuit does not select any cell,
the cell selection circuit includes:
a first wiring connected to one end of the energy holding circuit,
a second wiring connected to another end of the energy holding circuit,
(n+1) first wiring side switches each connected between the first wiring and a corresponding one of nodes of the n cells connected in series, and
(n+1) second wiring side switches each connected between the second wiring and a corresponding one of nodes of the n cells connected in series,
among the four clamp switches, a first arm having a first clamp switch and a second clamp switch connected in series and a second arm having a third clamp switch and a fourth clamp switch connected in series are connected in parallel between the first wiring and the second wiring, and the inductor is connected between a node between the first clamp switch and the second clamp switch and a node between the third clamp switch and the fourth clamp switch.

7. The energy transfer circuit according to claim 6, wherein
the controller is configured to control, in this order,
a first state for controlling a corresponding one of the first wiring side switches and a corresponding one of the at least one second wiring side switch connected to the nodes on both sides of a discharge cell to be discharged among the n cells to an on state, and the first clamp switch and the fourth clamp switch or the second clamp switch and the third clamp switch to an on state,
a second state for controlling the corresponding one of the first wiring side switch and the corresponding one of the at least one second wiring side switch connected to the nodes on both sides of the discharge cell to an off state, and the second clamp switch and the fourth clamp switch or the first clamp switch and the third clamp switch to an on state, and
a third state for controlling the corresponding one of the first wiring side switch and the corresponding one of the at least one second wiring side switch connected to the nodes on both sides of a charging cell to be charged among the n cells to an on state, and the first clamp switch and the fourth clamp switch, or the second clamp switch and the third clamp switch to an on state to allow a current to flow through the charging cell.

8. The energy transfer circuit according to claim 6, wherein
each of the plurality of first wiring side switches includes two switching elements each having a body diode connected in series in opposite directions, and
each of the at least one second wiring side switch includes two switching elements each having a body diode connected in series in opposite directions.

9. The energy transfer circuit according to claim 6, wherein each of the four clamp switches includes two switching elements each having a body diode connected in series in opposite directions.

* * * * *